(12) United States Patent
Hasegawa

(10) Patent No.: US 9,891,828 B2
(45) Date of Patent: Feb. 13, 2018

(54) TIERED STORAGE SYSTEM, STORAGE CONTROLLER, AND TIERING CONTROL METHOD

(71) Applicants: Kabushiki Kaisha Toshiba, Minato-ku (JP); Toshiba Solutions Corporation, Kawasaki-shi (JP)

(72) Inventor: Tomofumi Hasegawa, Inagi (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 59 days.

(21) Appl. No.: 15/206,412

(22) Filed: Jul. 11, 2016

(65) Prior Publication Data
US 2017/0269840 A1    Sep. 21, 2017

(30) Foreign Application Priority Data
Mar. 16, 2016    (JP) .................................. 2016-052510

(51) Int. Cl.
*G06F 3/06*    (2006.01)
*G06F 12/08*    (2016.01)

(52) U.S. Cl.
CPC ............ *G06F 3/0604* (2013.01); *G06F 3/064* (2013.01); *G06F 3/0631* (2013.01); *G06F 3/0647* (2013.01); *G06F 3/0665* (2013.01); *G06F 3/0683* (2013.01); *G06F 12/08* (2013.01); *G06F 2212/152* (2013.01); *G06F 2212/217* (2013.01); *G06F 2212/657* (2013.01)

(58) Field of Classification Search
CPC ....... G06F 3/0647; G06F 3/061; G06F 3/0685
See application file for complete search history.

(56) References Cited

U.S. PATENT DOCUMENTS

| | | | |
|---|---|---|---|
| 9,753,987 B1 * | 9/2017 | Dolan | G06F 17/3053 |
| 2007/0118710 A1 * | 5/2007 | Yamakawa | G06F 3/061 711/165 |
| 2014/0082310 A1 * | 3/2014 | Nakajima | G06F 12/0862 711/162 |
| 2014/0297944 A1 | 10/2014 | Abe | |
| 2015/0039825 A1 * | 2/2015 | Anderson | G06F 3/0685 711/114 |
| 2016/0283140 A1 * | 9/2016 | Kaushik | G06F 3/0643 |

FOREIGN PATENT DOCUMENTS

| | | |
|---|---|---|
| JP | 5362145 | 12/2013 |
| JP | 2014-191398 A | 10/2014 |
| WO | WO 2014/155666 A1 | 10/2014 |
| WO | WO 2015/162766 A1 | 10/2015 |

* cited by examiner

*Primary Examiner* — Edward J Dudek, Jr.
(74) *Attorney, Agent, or Firm* — Oblon, McClelland, Maier & Neustadt, L.L.P.

(57) ABSTRACT

According to one embodiment, a tiered storage system includes a first storage device, a second storage device and a storage controller. The first and second storage devices are positioned as an upper tier and a lower tier, respectively. The storage controller transfers data of q physical extents in the second storage device to q free physical extents in the first storage device, when an access request from a host computer designates access to one or more logical blocks including a first logical block, the first logical block is included in a first logical extent, and the first logical extent belongs to an extent group including q logical extents to which the q physical extents are allocated.

20 Claims, 21 Drawing Sheets

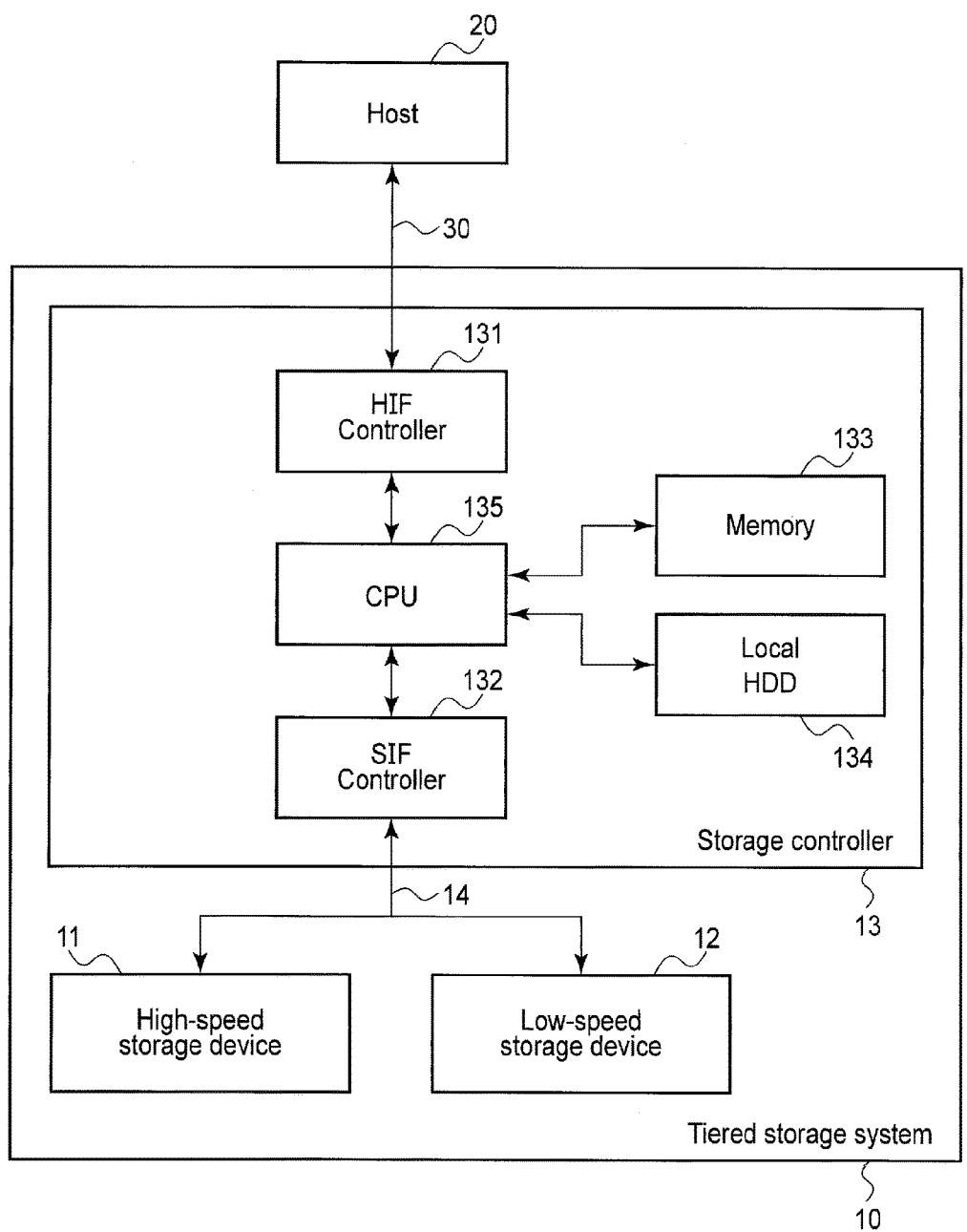
F I G. 1

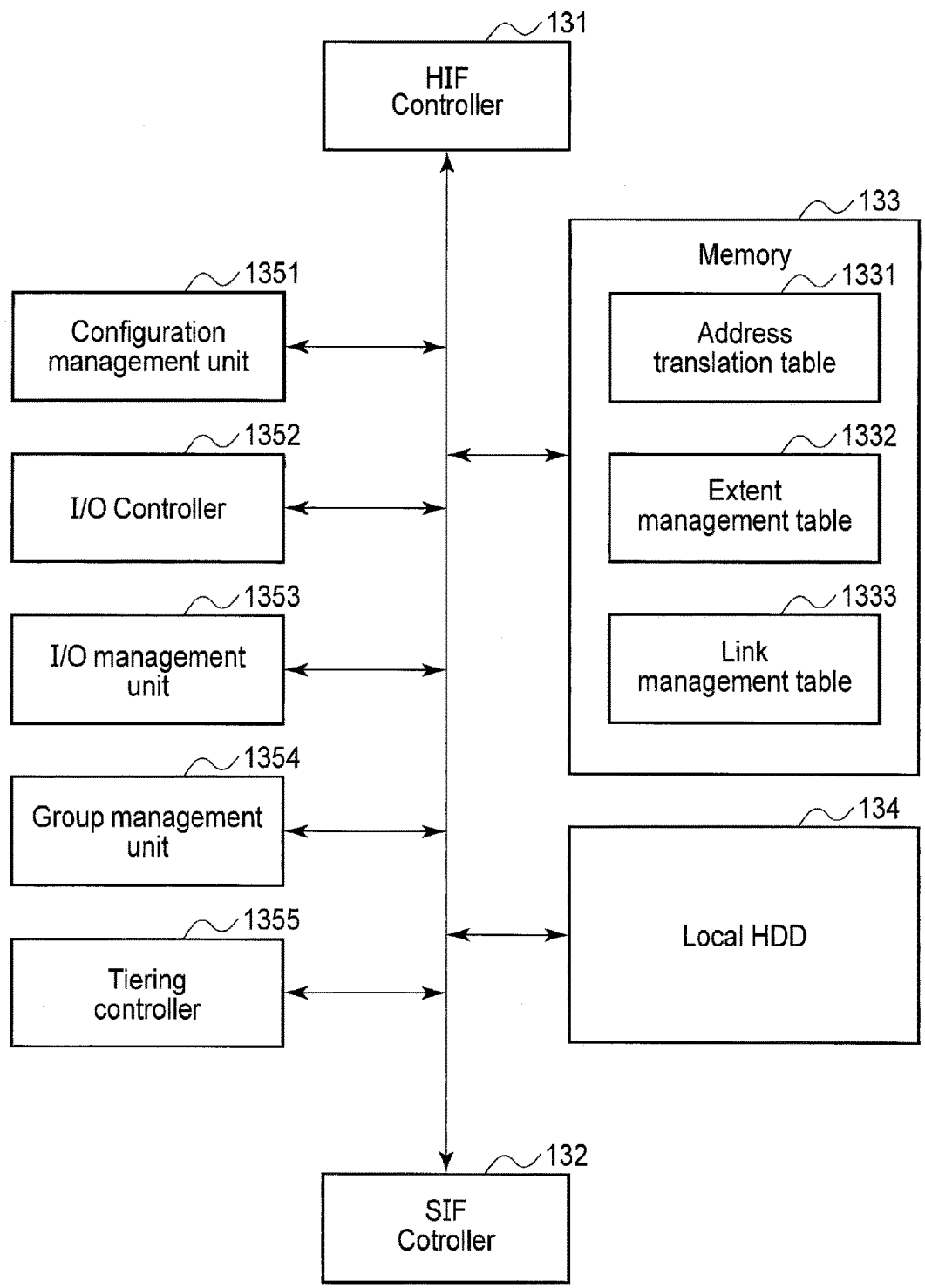
F I G. 2

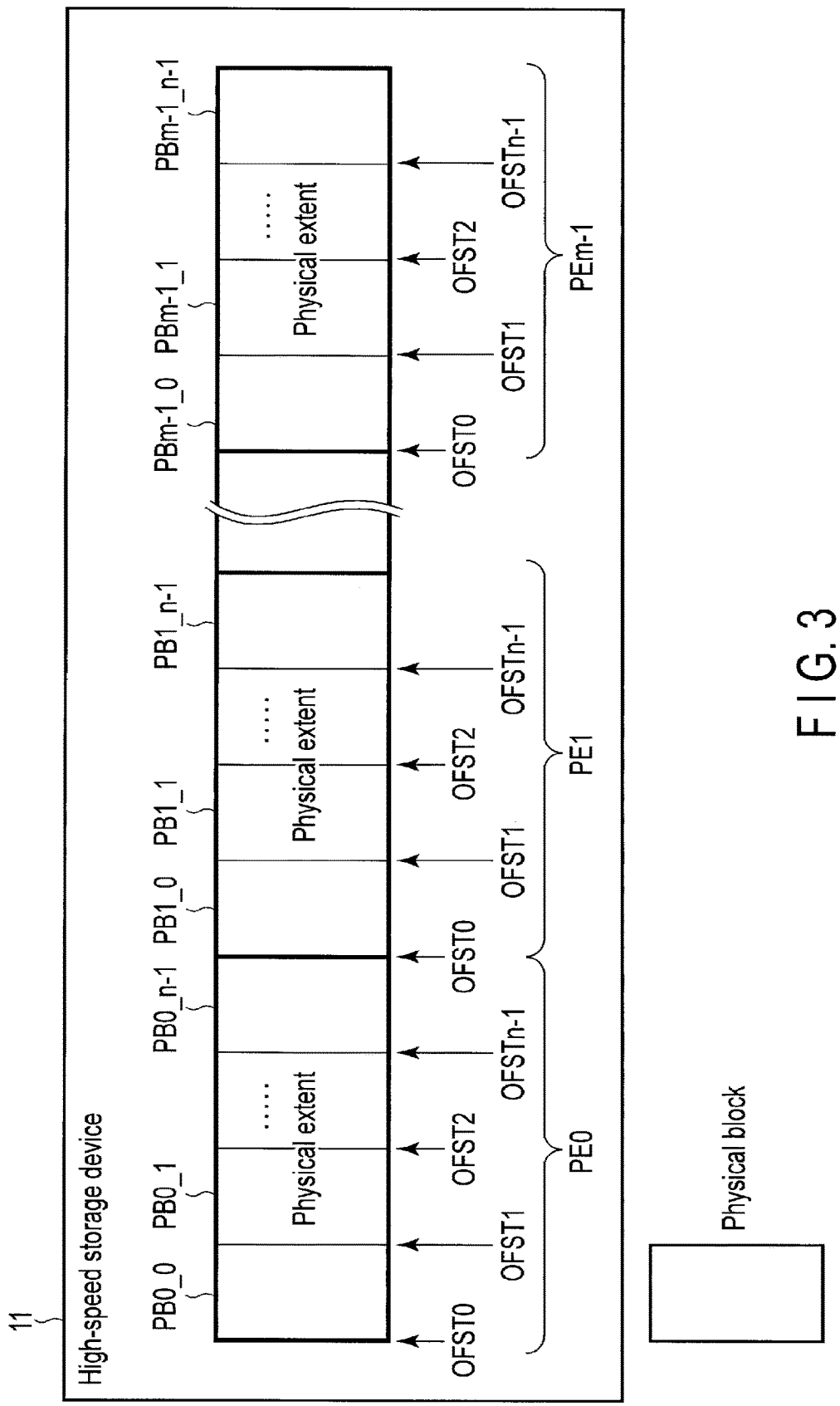
F I G. 3

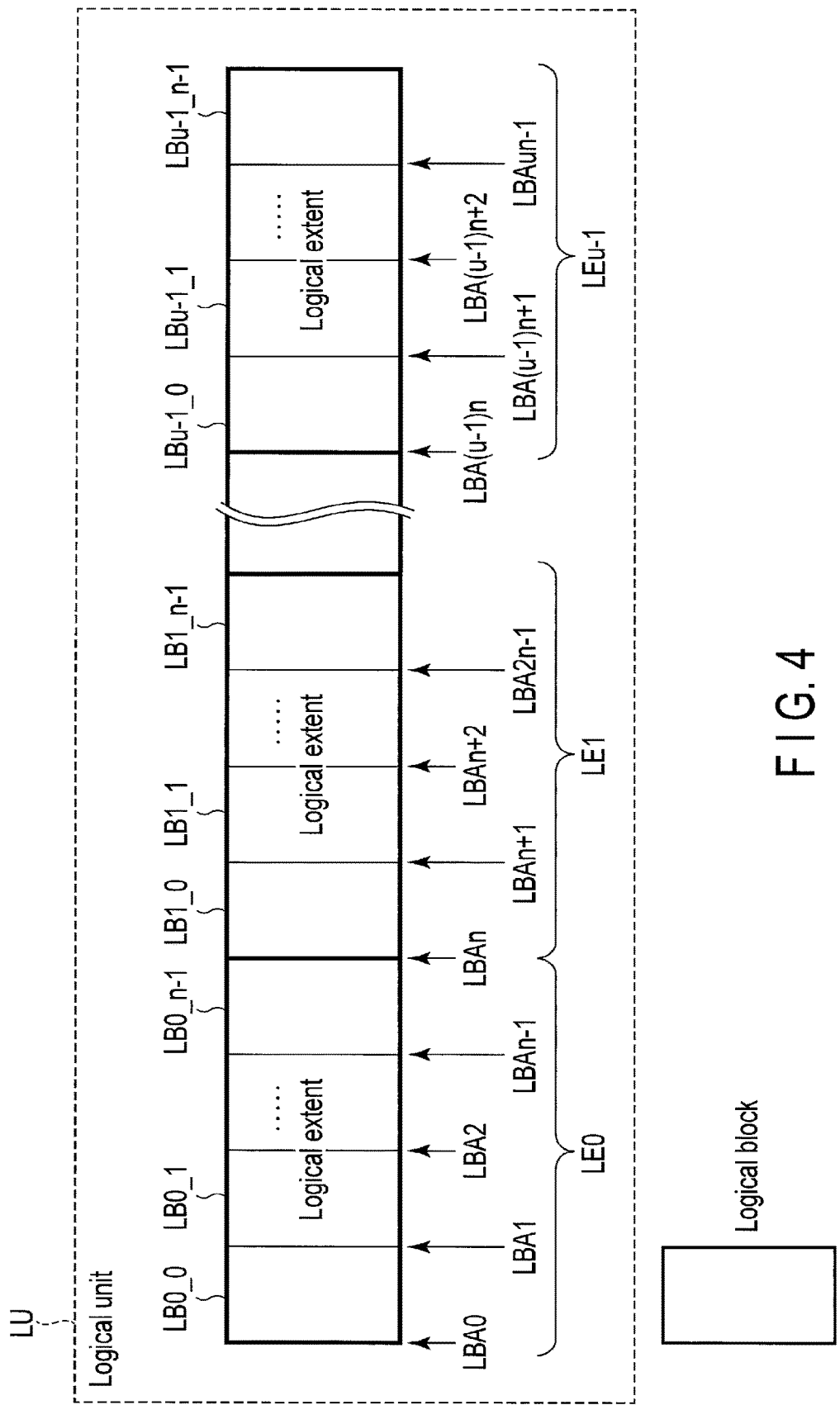
F I G. 4

| Logical unit number (LUN) | Logical block address (LBA) | Logical extent number (LEN) | Physical extent number (PEN) | Offset |
|---|---|---|---|---|
| LUNa | LBAb | A | P | OFSTc |

1331

F I G. 5

| Logical extent number (LEN) | Extent group number (EGN) | Preceding link extent (PLE) | Succeeding link extent (SLE) | Access count (AC) | Last access time (LAT) |
|---|---|---|---|---|---|
| A | 0 | 0 | 0 | 0 | 0 |
| B | 0 | 0 | 0 | 0 | 0 |
| C | 0 | 0 | 0 | 0 | 0 |
| D | 0 | 0 | 0 | 0 | 0 |
| E | 0 | 0 | 0 | 0 | 0 |

1332

F I G. 6

1333

| | A | B | C | D | E | F | ... |
|---|---|---|---|---|---|---|---|
| A | | | | | | | |
| B | | | | | | | |
| C | | | | | | | |
| D | | | | | | | |
| E | | | | | | | |
| F | | | | | | | |
| ⋮ | | | | | | | |

F I G. 7

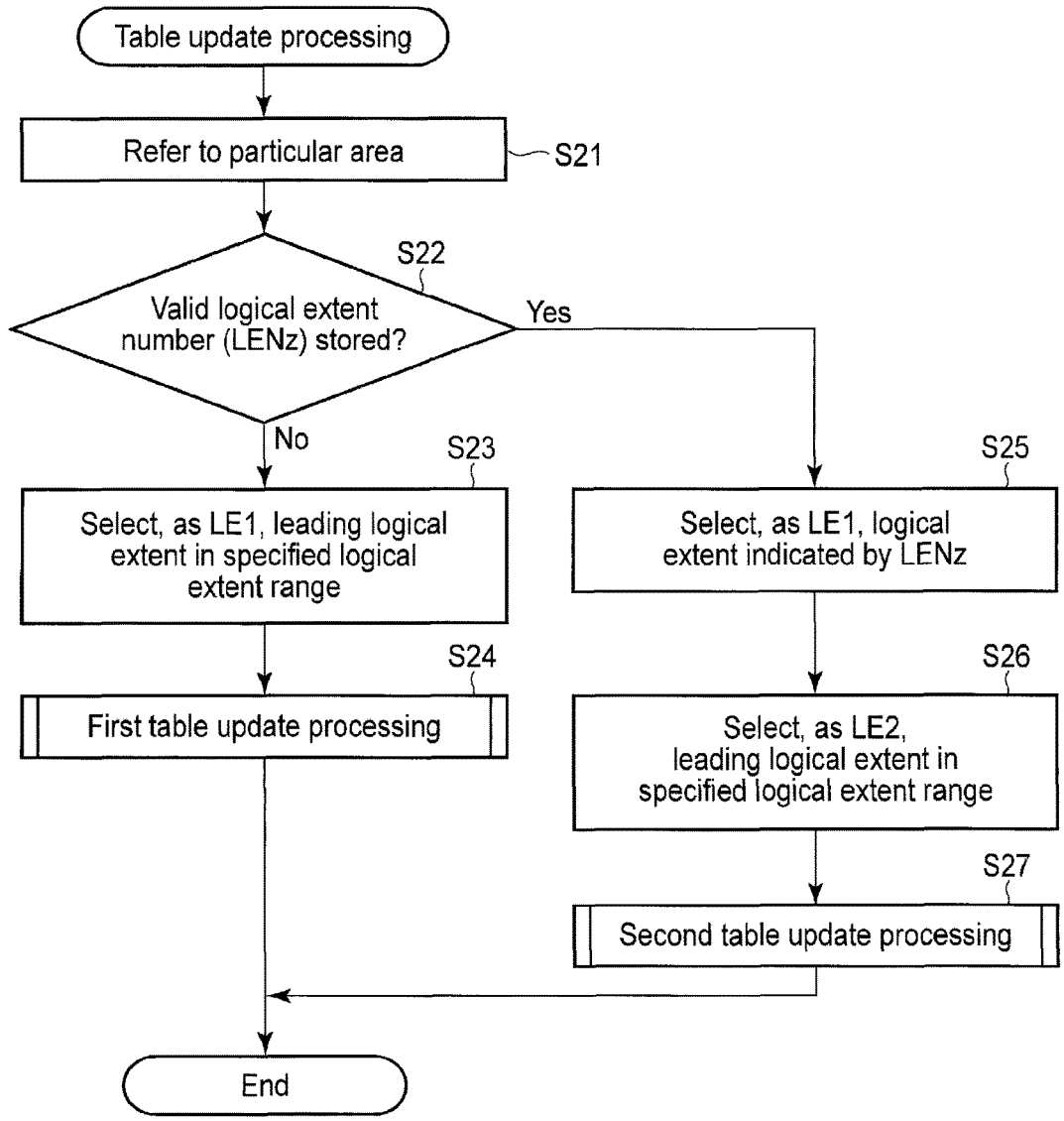
F I G. 9

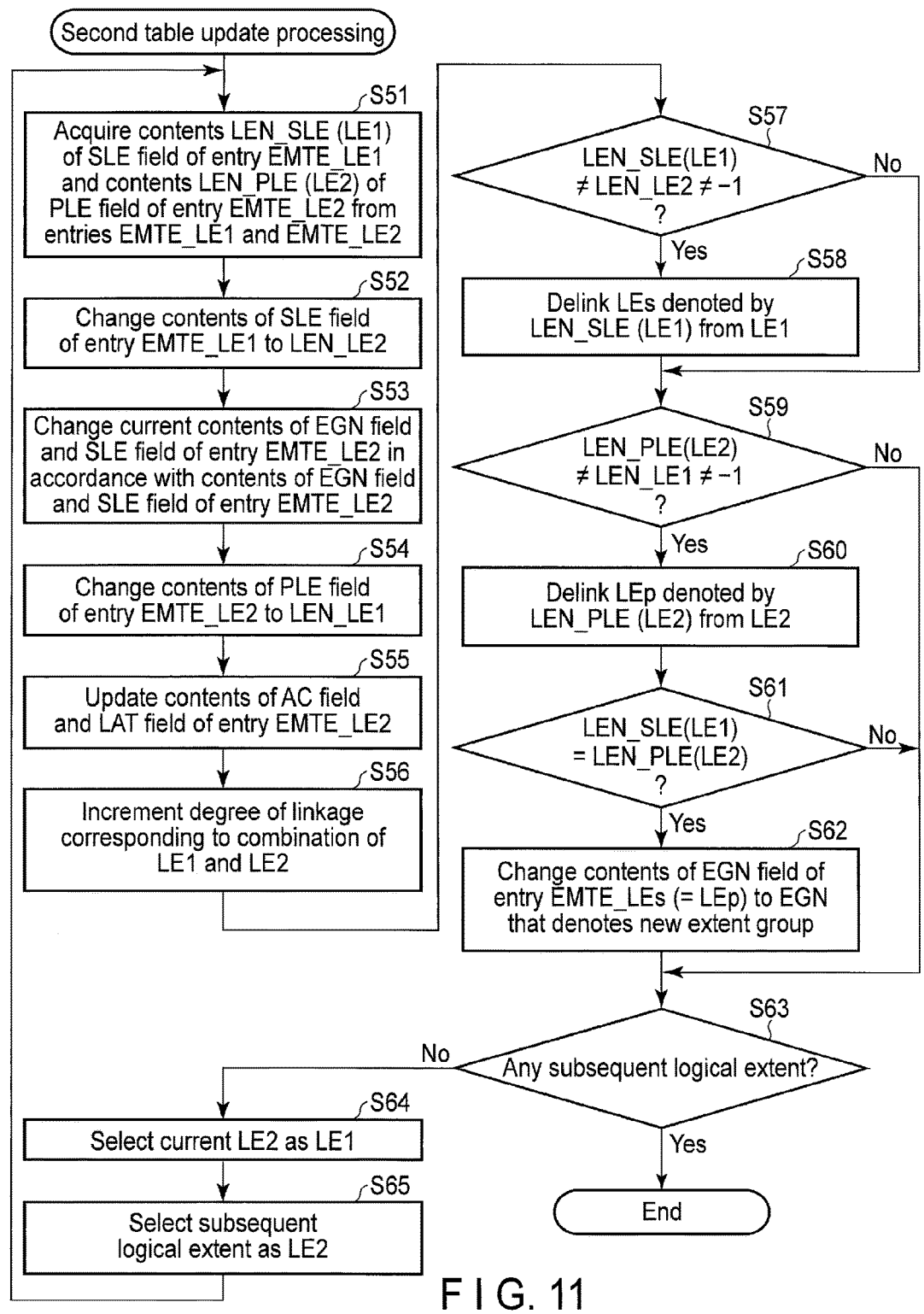
F I G. 11

1332

| Logical extent number (LEN) | Extent group number (EGN) | Preceding link extent (PLE) | Succeeding link extent (SLE) | Access count (AC) | Last access time (LAT) |
|---|---|---|---|---|---|
| A | 0→1 | 0→-1 | 0→B | 0→1 | 0→ xx : xx : xx |
| B | 0→1 | 0→A | 0→-1 | 0→1 | 0→ xx : xx : xx |
| C | 0 | 0 | 0 | 0 | 0 |
| D | 0 | 0 | 0 | 0 | 0 |
| E | 0 | 0 | 0 | 0 | 0 |
|  |  |  |  |  |  |

F I G. 12

1333

|   | A | B | C | D | E | F | ... |
|---|---|---|---|---|---|---|---|
| A |   | 0→1 |   |   |   |   |   |
| B | 0→1 |   |   |   |   |   |   |
| C |   |   |   |   |   |   |   |
| D |   |   |   |   |   |   |   |
| E |   |   |   |   |   |   |   |
| F |   |   |   |   |   |   |   |
| ⋮ |   |   |   |   |   |   |   |

F I G. 13

1332

| Logical extent number (LEN) | Extent group number (EGN) | Preceding link extent (PLE) | Succeeding link extent (SLE) | Access count (AC) | Last access time (LAT) |
|---|---|---|---|---|---|
| A | 1 | -1 | B | 1 | xx : xx : xx |
| B | 1 | A | -1→C | 1 | xx : xx : xx |
| C | 0→1 | 0→B | 0→-1→D | 0→1 | 0→ xx : xx : xx |
| D | 0→1 | 0→C | 0→-1 | 0→1 | 0→ xx : xx : xx |
| E | 0 | 0 | 0 | 0 | 0 |

|  | A | B | C | D | E | F | ... |
|---|---|---|---|---|---|---|---|
| A |  | 1 |  |  |  |  |  |
| B | 1 |  | 0→1 |  |  |  |  |
| C |  | 0→1 |  | 0→1 |  |  |  |
| D |  |  | 0→1 |  |  |  |  |
| E |  |  |  |  |  |  |  |
| F |  |  |  |  |  |  |  |
| ⋮ |  |  |  |  |  |  |  |

| Logical extent number (LEN) | Extent group number (EGN) | Preceding link extent (PLE) | Succeeding link extent (SLE) | Access count (AC) | Last access time (LAT) |
|---|---|---|---|---|---|
| A | 1 | -1→D | B | 1→2 | xx : xx : xx |
| B | 1 | A | C | 1→2 | xx : xx : xx |
| C | 1 | B | D | 1 | xx : xx : xx |
| D | 1 | C | -1→A | 1 | xx : xx : xx |
| E | 0 | 0 | 0 | 0 | 0 |

F I G. 16

1333

|   | A | B | C | D | E | F | ... |
|---|---|---|---|---|---|---|---|
| A |   | 1→2 |   | 0→1 |   |   |   |
| B | 1→2 |   | 1 |   |   |   |   |
| C |   | 1 |   | 1 |   |   |   |
| D | 0→1 |   | 1 |   |   |   |   |
| E |   |   |   |   |   |   |   |
| F |   |   |   |   |   |   |   |
| ⋮ |   |   |   |   |   |   |   |

F I G. 17

1332

| Logical extent number (LEN) | Extent group number (EGN) | Preceding link extent (PLE) | Succeeding link extent (SLE) | Access count (AC) | Last access time (LAT) |
|---|---|---|---|---|---|
| A | 1 | D→-1 | B | 2 | xx : xx : xx |
| B | 1 | A | C→D | 2 | xx : xx : xx |
| C | 1→2 | B→-1 | D→-1 | 1 | xx : xx : xx |
| D | 1 | C→B | A→E | 1→2 | xx : xx : xx |
| E | 0→1 | 0→D | 0→-1 | 0→1 | 0→ xx : xx : xx |

F I G. 18

1333

|   | A | B | C | D | E | F | ... |
|---|---|---|---|---|---|---|---|
| A |   | 2 |   | 1→0 |   |   |   |
| B | 2 |   | 1→0 | 0→1 |   |   |   |
| C |   | 1→0 |   | 1→0 |   |   |   |
| D | 1→0 | 0→1 | 1→0 |   | 0→1 |   |   |
| E |   |   |   | 0→1 |   |   |   |
| F |   |   |   |   |   |   |   |
| ⋮ |   |   |   |   |   |   |   |

F I G. 19

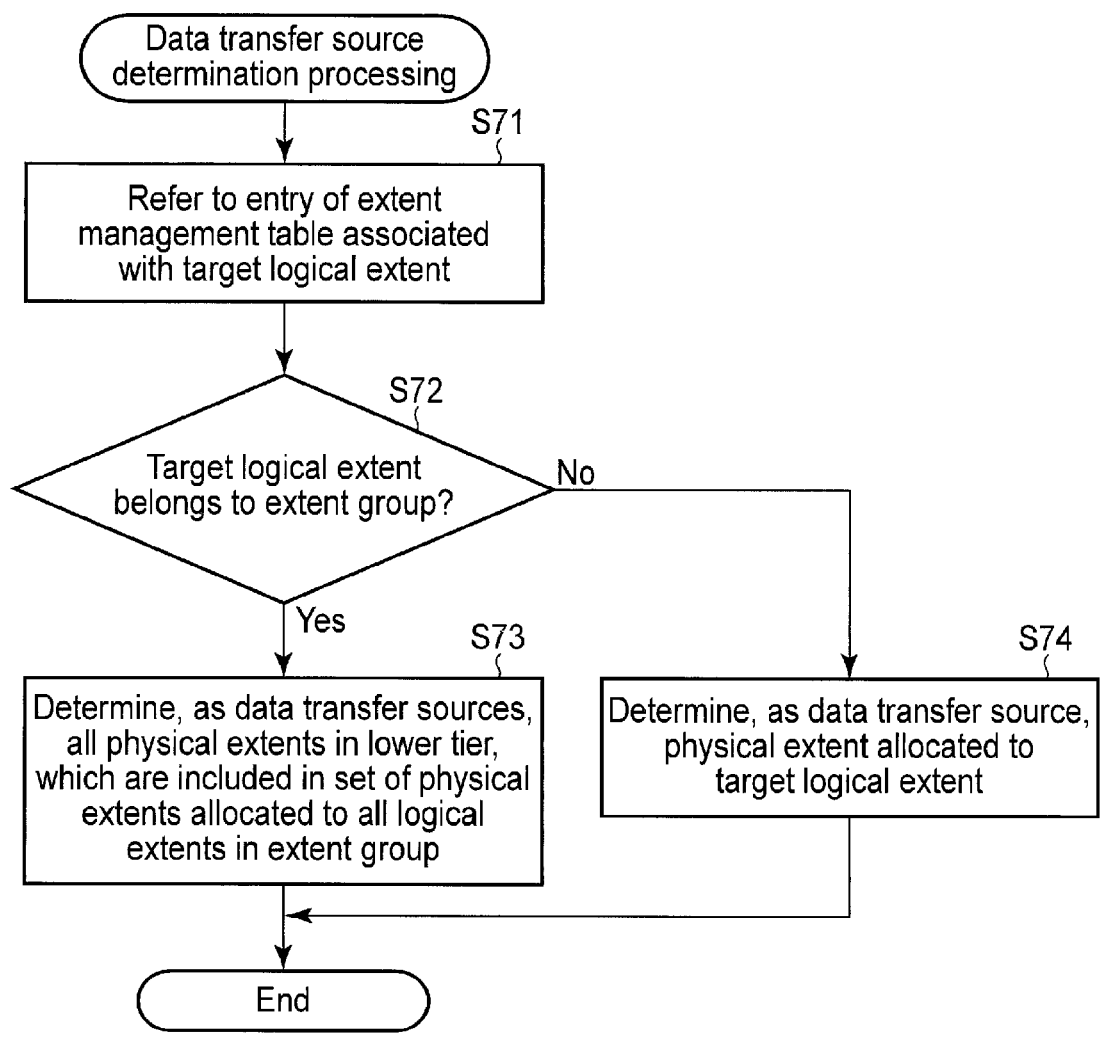
F I G. 20

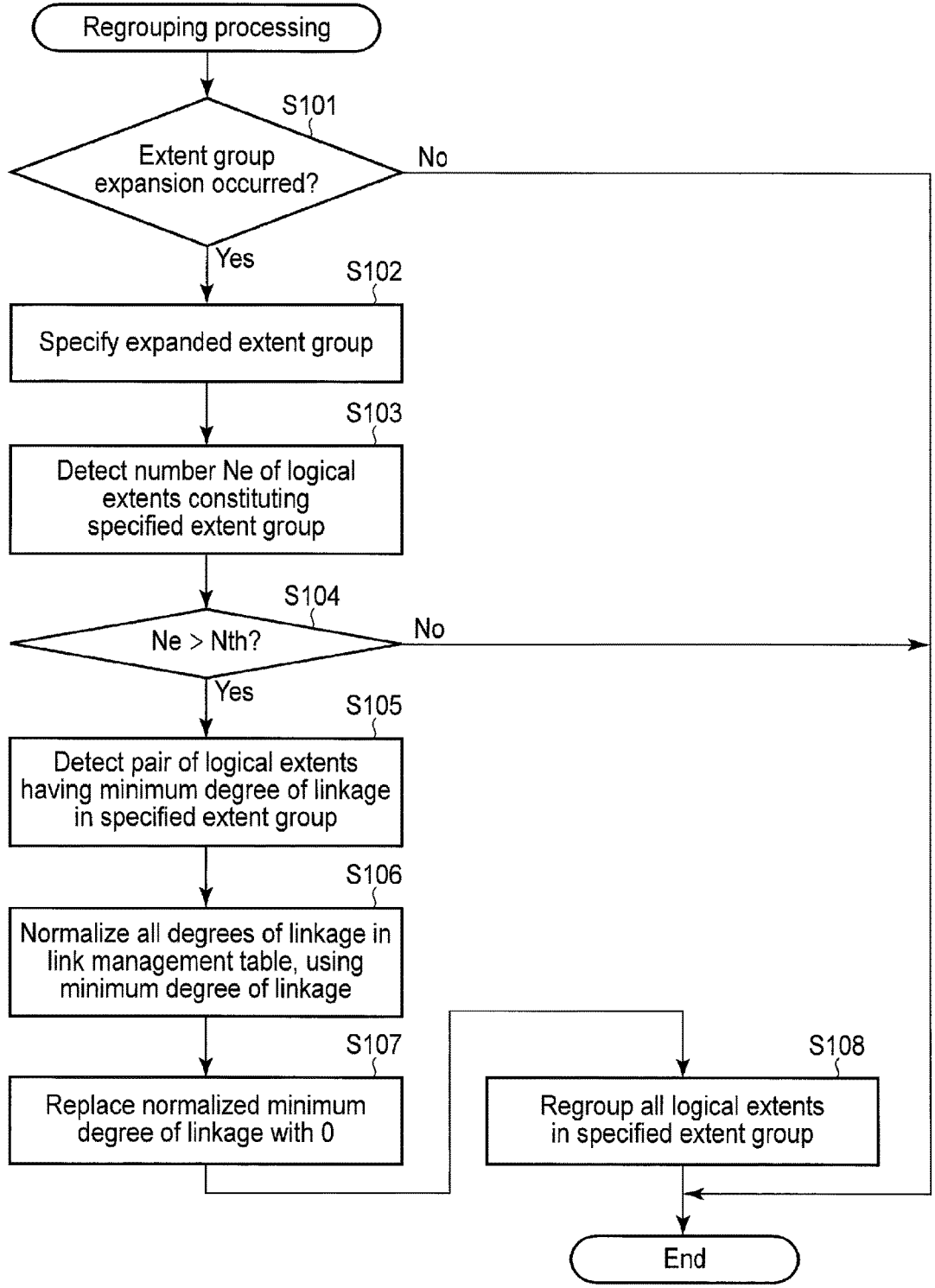
F I G. 22

1333

|   | A | B | C | D | E | F | ... |
|---|---|---|---|---|---|---|---|
| A |   | 50 |   |   |   |   |   |
| B | 50 |   | 132 |   |   |   |   |
| C |   | 132 |   | 5 |   |   |   |
| D |   |   | 5 |   | 37 |   |   |
| E |   |   |   | 37 |   | 82 |   |
| F |   |   |   |   | 82 |   |   |
| ⋮ |   |   |   |   |   |   |   |

240 ⬇

1333

|   | A | B | C | D | E | F | ... |
|---|---|---|---|---|---|---|---|
| A |   | 10 |   |   |   |   |   |
| B | 10 |   | 26.4 |   |   |   |   |
| C |   | 26.4 |   | 1 |   |   |   |
| D |   |   | 1 |   | 7.4 |   |   |
| E |   |   |   | 7.4 |   | 16.4 |   |
| F |   |   |   |   | 16.4 |   |   |
| ⋮ |   |   |   |   |   |   |   |

F I G. 24

1333

| | A | B | C | D | E | F | ... |
|---|---|---|---|---|---|---|---|
| A | | 10 | | | | | |
| B | 10 | | 26.4 | | | | |
| C | | 26.4 | | 1 | | | |
| D | | | 1 | | 7.4 | | |
| E | | | | 7.4 | | 16.4 | |
| F | | | | | 16.4 | | |
| ⋮ | | | | | | | |

250 ⬇

1333

| | A | B | C | D | E | F | ... |
|---|---|---|---|---|---|---|---|
| A | | 10 | | | | | |
| B | 10 | | 26.4 | | | | |
| C | | 26.4 | | 0 | | | |
| D | | | 0 | | 7.4 | | |
| E | | | | 7.4 | | 16.4 | |
| F | | | | | 16.4 | | |
| ⋮ | | | | | | | |

F I G. 25

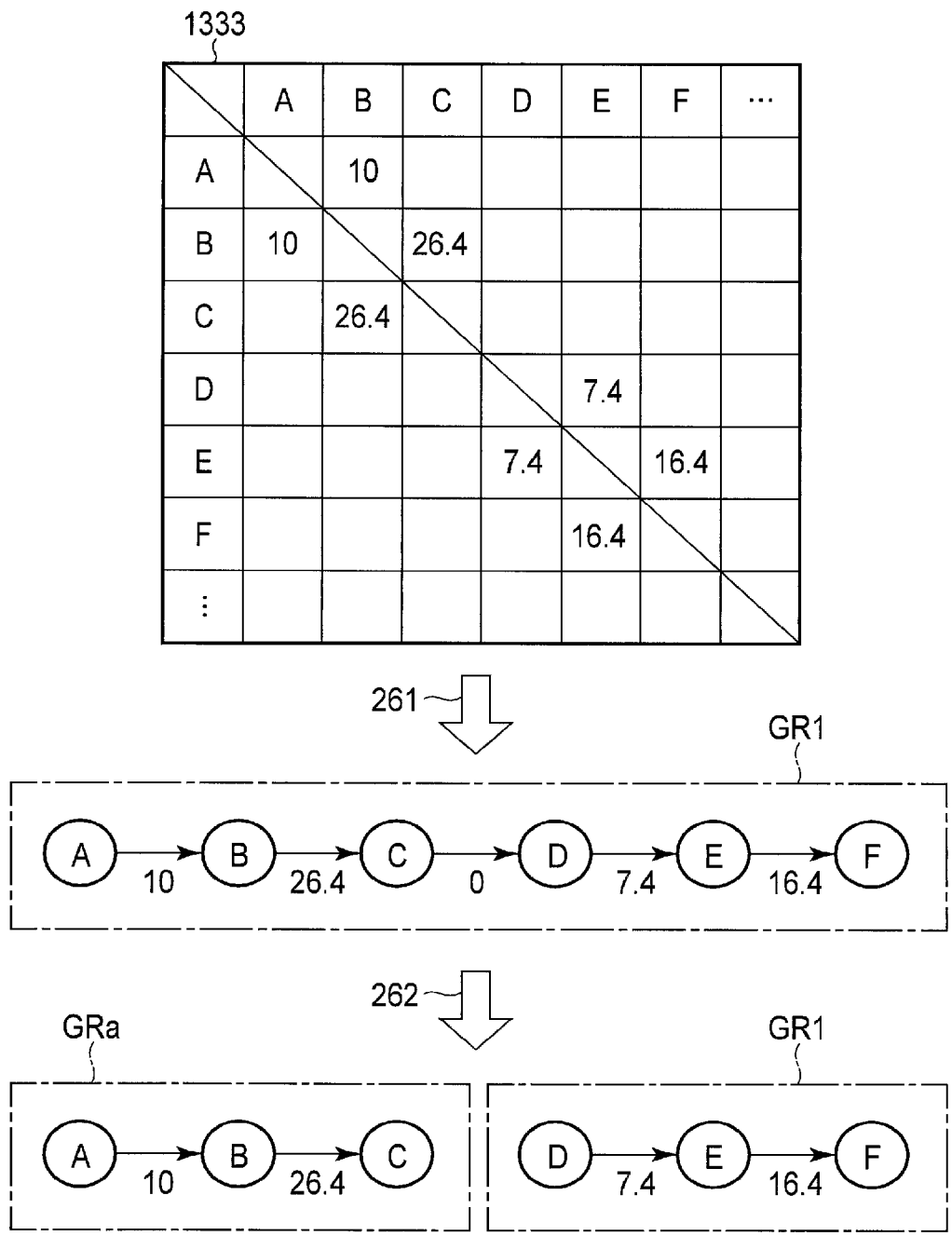
F I G. 26

TIERED STORAGE SYSTEM, STORAGE CONTROLLER, AND TIERING CONTROL METHOD

CROSS-REFERENCE TO RELATED APPLICATIONS

This application is based upon and claims the benefit of priority from Japanese Patent Application No. 2016-052510, filed Mar. 16, 2016, the entire contents of which are incorporated herein by reference.

FIELD

Embodiments described herein relate generally to a tiered storage system, a storage controller, and a tiering control method.

BACKGROUND

A storage system comprising a first storage device and a second storage device that have different access speeds has recently been developed. Assume here that the access speed and storage capacity of the first storage device are high and small, respectively, and that the access speed and storage capacity of the second storage device are lower and greater than those of the first storage device, respectively. The storage system is realized by hierarchically combining the first and second storage devices as upper and lower tiers, respectively. This technique is also called a storage tiering technique, and the storage system employing the storage tiering technique is also called a tiered storage system.

In the tiered storage system, tiers (storage devices) in which data is to be arranged (stored) are determined/changed in accordance with the characteristics of the data. More specifically, data having a high access frequency is arranged in the upper tier (first storage device), and data having a low access frequency is arranged in the lower tier (second storage device). This arrangement (namely, tiering) enables the tiered storage system to realize both high performance and low cost.

In general, tiering in the tiered storage system is automatically performed. For the automatic tiering, a storage controller monitors, for example, an access status in the tiered storage system data group by data group called an extent. The extent generally has a size greater than the basic size (so-called block size) for data management (data access). The status of access to each extent is expressed by an access statistical value, such as the number of accesses.

The storage controller performs, for example, periodically, estimation associated with the access frequency of each extent, based on the access statistical value thereof. Based on the periodical estimation result, the storage controller transfers (rearranges) data from the lower tier to the upper tier and/or vice versa extent by extent. However, data transfer between the tiers based on the periodical access frequency estimation will cause significant overhead and require a large amount of time.

BRIEF DESCRIPTION OF THE DRAWINGS

FIG. 1 is a block diagram showing an exemplary hardware configuration of a computer system including a tiered storage system according to an embodiment;

FIG. 2 is a block diagram mainly showing an exemplary functional configuration of the storage controller shown in FIG. 1;

FIG. 3 is a diagram showing an exemplary relationship between physical extents and physical blocks in the embodiment;

FIG. 4 is a diagram showing an exemplary relationship between logical extents and logical blocks in the embodiment;

FIG. 5 is a diagram showing a data structure example of an address translation table shown in FIG. 2;

FIG. 6 is a diagram showing a data structure example of an extent management table shown in FIG. 2;

FIG. 7 is a diagram showing a data structure example of a link management table shown in FIG. 2;

FIG. 9 is a flowchart showing an exemplary procedure of table update processing included in the access processing of FIG. 8;

FIG. 11 is a flowchart showing an exemplary procedure of second table update processing included in the table update processing of FIG. 9;

FIG. 12 is a diagram showing an example of the extent management table obtained after the table update processing is executed in response to a first access request;

FIG. 13 is a diagram showing an example of the link management table obtained after the table update processing is executed in response to the first access request;

FIG. 14 is a diagram showing an example of the extent management table obtained after the table update processing is executed in response to a second access request;

FIG. 15 is a diagram showing an example of the link management table obtained after the table update processing is executed in response to the second access request;

FIG. 16 is a diagram showing an example of the extent management table obtained after the table update processing is executed in response to a third access request;

FIG. 17 is a diagram showing an example of the link management table obtained after the table update processing is executed in response to the third access request;

FIG. 18 is a diagram showing an example of the extent management table obtained after the table update processing is executed in response to a fourth access request;

FIG. 19 is a diagram showing an example of the link management table obtained after the table update processing is executed in response to the fourth access request;

FIG. 20 is a flowchart showing an exemplary procedure of data transfer source determination processing, which is included in the access processing of FIG. 8;

FIG. 22 is a flowchart showing an exemplary procedure of regrouping processing according to a modification of the embodiment;

FIG. 24 is a diagram showing, for comparison, examples of the link management table obtained before and after a second preprocess in the modification;

FIG. 25 is a diagram showing, for comparison, examples of the link management table obtained before and after a third preprocess in the modification; and FIG. 26 is a diagram showing, an example of the link management table obtained immediately after the third preprocess, and showing, for comparison, examples of extent groups obtained before and after the regrouping.

DETAILED DESCRIPTION

Figure 8:
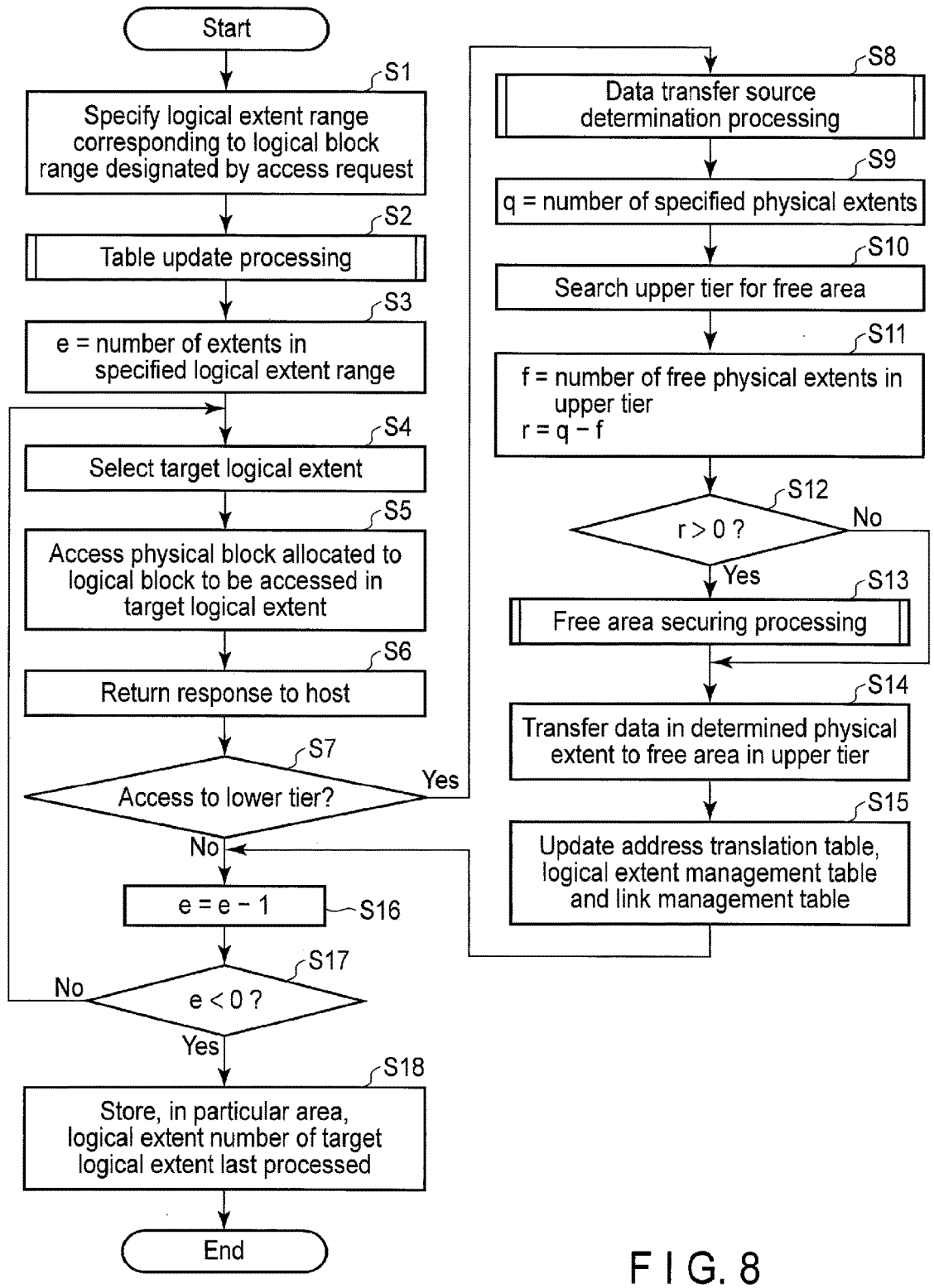
FIG. 8 is a flowchart showing an exemplary procedure of access processing in the embodiment.

Various embodiments will be described hereinafter with reference to the accompanying drawings.

In general, in accordance with one embodiment, a tiered storage system includes a first storage device, a second storage device and a storage controller. The first storage device includes a first storage area having a plurality of physical extents each including a first number of physical blocks, and is positioned as an upper tier. The second storage device includes a second storage area having a plurality of physical extents each including the first number of physical blocks. The second storage device has a lower access speed than the first storage device and is positioned as a lower tier. The storage controller controls access to the first and second storage devices, and includes a configuration management unit, an input/output controller, an input/output management unit, a group management unit and a tiering controller. The configuration management unit constructs a logical unit including a virtualized storage area having a plurality of logical blocks each having a size identical to a size of each of the physical blocks, and provides the logical unit to a host computer which uses the tiered storage system. The input/output controller reads data from the first or second storage device or writes data to the first or second storage device in accordance with an access request from the host computer. The input/output management unit manages the virtualized storage area of the logical unit as a storage area including a plurality of logical extents each having the first number of logical blocks. The group management unit manages a strength of linkage, associated with access, of a respective pair of different logical extents included in the plurality of logical extents, based on a corresponding degree of linkage which indicates a degree of successive access to the respective pair of logical extents, and manages, as extent groups, sets of logical extents included in respective series of combinations that mutually have a linkage relationship. The tiering controller transfers data of q physical extents, allocated to q logical extents, in the second storage device to q free physical extents in the first storage device, and changes q physical extents to be allocated to the q logical extents from the q physical extents in the second storage device to the q physical extents in the first storage device, when the access request designates access to one or more logical blocks including a first logical block, the first logical block is included in a first logical extent, and the first logical extent belongs to an extent group including the q logical extents to which the q physical extents in the second storage device are allocated.

FIG. 1 is a block diagram showing an exemplary hardware configuration of a computer system including a tiered storage system according to an embodiment. The computer system shown in FIG. 1 includes a tiered storage system 10 and a host computer (hereinafter, referred to as a host) 20. That is, the computer system includes a single host. However, the computer system may include a plurality of hosts.

The host 20 uses, as its own external storage device, a logical unit provided by the tiered storage system 10. The logical unit is also called a logical disk or a logical volume, and includes a virtualized storage area (namely, a logical storage area). The host 20 is connected to the tiered storage system 10 (more specifically, a storage controller 13 in the tiered storage system 10) through, for example, a host interface bus 30. In the embodiment, the host interface bus 30 is Fibre Channel (FC). However, the host interface bus 30 may be an interface bus other than FC, such as Small Computer System Interface (SCSI), Serial Attached SCSI (SAS), Internet SCSI (iSCSI), Ethernet (registered trademark) or Serial AT Attachment (SATA). Moreover, the host 20 may be connected to the tiered storage system 10 through a network, such as a storage area network (SAN), the Internet, or an intranet.

The host 20 is a physical computer, such as a server or a client personal computer. Within the host 20, an application program operates for accessing data in the logical unit provided by the tiered storage system 10. According to this application program, the host 20 uses the tiered storage system 10 through the host interface bus 30.

The tiered storage system 10 includes a high-speed storage device (first storage device) 11, a low-speed storage device (second storage device) 12 and the storage controller 13. The high-speed storage device 11 and the low-speed storage device 12 are connected to the storage controller 13 through a storage interface bus 14. In the embodiment, the storage interface bus 14 is Fibre Channel (FC). However, the storage interface bus 14 may be an interface bus other than the FC, like the host interface bus 30.

The high-speed storage device 11 includes, for example, a single solid-state drive (SSD) that is compatible with a hard disk drive (HDD), and has a higher access speed than the HDD (that is, superior thereto in access performance). In contrast, the low-speed storage device 12 includes, for example, a single HDD.

Thus, in the embodiment, the low-speed storage device 12 is lower in access speed than the high-speed storage device 11 (that is, inferior thereto in access performance). In contrast, assume that the storage capacity of the low-speed storage device 12 is greater than that of the high-speed storage device 11. In the embodiment, the high-speed storage device 11 is used as a storage device as an upper tier (a high-speed tier=a first tier), and the low-speed storage device 12 is used as a storage device as a lower tier (a low-speed tier=a second tier). The tiered storage system 10 may also include a storage device (as a third tier) lower in speed than the low-speed storage device 12.

The high-speed storage device 11 may be a flash array storage device with a flash memory, or a storage device called an all flash array, unlike the embodiment. Similarly, the low-speed storage device 12 may be a storage device of an array configuration including a plurality of HDDs.

Alternatively, the high-speed storage device 11 may include a high-speed HDD, such as an HDD for FC, and the low-speed storage device 12 may include a low-speed HDD, such as an HDD for SATA. Further, the low-speed storage device 12 may be an optical disk drive, such as a Blu-ray disk (registered trademark) drive or a DVD (registered trademark) drive, or a tape device. If the tape device is used as the low-speed storage device 12, the optical disk drive may be used as the high-speed storage device 11.

The storage controller 13 receives, from the host 20, a request (input/output request) of access (read access or write access) using a logical address, and executes the requested access (input/output). For the execution of the access, the storage controller 13 translates a logical address into a physical address, using a well-known address translation function. The logical address indicates an address in the logical unit. The physical address indicates the physical position of a storage area that is included in the high-speed storage device 11 or the low-speed storage device 12, and is associated with the logical address. The storage controller 13 accesses the high-speed storage device 11 or the low-speed storage device 12, based on the physical address.

The storage controller 13 includes a host interface controller (hereinafter, referred to as an HIF controller) 131, a storage interface controller (hereinafter, referred to as an SIF controller) 132, a memory 133, a local HDD 134 and a CPU 135.

The HIF controller 131 controls data transfer (a data transfer protocol) between the HIF controller 131 and the host 20. The HIF controller 131 receives an access request from the host, and replies a response to the access request. The access request designates a data read from or a data write to the logical unit (namely, access to the logical unit). Upon receiving the access request from the host 20, the HIF controller 131 transmits the access request to the CPU 135. The CPU 135 having received the access request processes the access request.

The SIF controller 132 receives, from the CPU 135, an access command (more specifically, a read command or a write command to the high-speed storage device 11 or the low-speed storage device 12) corresponding to the access request received by the CPU 135 from the host 20. The SIF controller 132 accesses the high-speed storage device 11 or the low-speed storage device 12 in accordance with the received access command.

The memory 133 is a rewritable volatile memory, such as a DRAM. A part of the storage area of the memory 133 is used to store at least a part of a control program loaded from the local HDD 134. Another part of the storage area of the memory 133 is used to store an address translation table 1331, an extent management table 1332 and a link management table 1333 loaded from the local HDD 134 (FIG. 2).

The local HDD 134 stores the control program. The CPU 135 loads at least a part of the control program, stored in the local HDD 134, into the memory 133 by executing an initial program loader (IPL) when the storage controller 13 is started. The IPL is stored in a nonvolatile memory, such as a ROM or a flash ROM.

The CPU 135 is a processor such as a microprocessor. The CPU 135 functions as a configuration management unit 1351, an input/output (I/O) controller 1352, an input/output (I/O) management unit 1353, a group management unit 1354 and a tiering controller 1355 (FIG. 2) in accordance with the control program loaded into the memory 133. That is, the CPU 135 controls the whole tiered storage system 10 by executing the control program stored in the memory 133.

In the embodiment, the storage controller 13 is provided independently of the host 20 as shown in FIG. 1. However, the storage controller 13 may be built in the host 20. In this case, the storage controller 13 (more specifically, the function of the storage controller 13) may be realized using a part of the function of the operating system (OS) of the host 20.

Alternatively, the storage controller 13 may be incorporated in a card that is used, inserted in the card slot of the host 20. Yet alternatively, a part of the storage controller 13 may be built in the host 20, and the remaining part of the storage controller 13 may be incorporated in the card. Further, the host 20, the storage controller 13, and part of or the entire high-speed and low-speed storage devices 11 and 12 may be housed in a housing.

FIG. 2 is a block diagram mainly showing an exemplary functional configuration of the storage controller 13 shown in FIG. 1. The storage controller 13 includes the configuration management unit 1351, the I/O controller 1352, the I/O management unit 1353, the group management unit 1354 and the tiering controller 1355. At least the configuration management unit 1351, I/O controller 1352, the I/O management unit 1353, the group management unit 1354, or the tiering controller 1355 may be realized by hardware.

The configuration management unit 1351 manages the storage configuration of the tiered storage system 10. This configuration management includes constructing the logical unit and proving the host 20 with the logical unit, based on the storage areas of the high-speed storage device 11 and the low-speed storage device 12. In the embodiment, the storage area (logical storage area) of the logical unit is divided into small areas of a certain size called logical blocks for managing the logical unit. That is, the logical unit includes a plurality of logical blocks.

In contrast, the storage areas (physical storage areas) of the high-speed storage device 11 and the low-speed storage device 12 are each divided into areas, called physical extents, having a size greater than that of the logical block. Each physical extent is further divided into small areas having the same size as the logical block and each called a physical block. That is, the storage areas of the high-speed storage device 11 and the low-speed storage device 12 each include a plurality of physics extents, and each physical extent includes a certain number (first number) of sequential physical blocks.

In the embodiment, the storage area of the logical unit is also divided into areas that are called logical extents, and each have the same size as the physical extent. That is, the storage area of the logical unit also includes a plurality of logical extents. Each logical extent includes the same number (namely, the first number) of logical blocks as that of the physical blocks. Accordingly, the boundary of each logical extent coincides with the boundary of a logical block.

The size (extent size) of each of the physical extent and the logical extent is, for example, 4 Kbytes (KB), i.e., 4,096 bytes (B). The size (block size) of each of the physical block and the logical block is, for example, 512 bytes (B). That is, the first number is 8, and each physical extent (logical extent) includes 8 physical blocks (8 logical blocks). However, the extent size and the block size are not limited to 4 KB and 512 B, respectively, and the first number is not limited to 8.

The I/O controller 1352 reads data from the high-speed storage device 11 or the low-speed storage device 12 in accordance with an access request for a data read from the host 20. Similarly, the I/O controller 1352 writes data to the high-speed storage device 11 or the low-speed storage device 12 in accordance with an access request for a data write from the host 20.

The I/O management unit 1353 manages I/O (access) corresponding to the access request from the host 20. Mainly for this I/O management, the I/O management unit 1353 divides the storage area of the logical unit into the above-mentioned plurality of logical extents. That is, the I/O management unit 1353 manages the storage area of the logical unit as a storage area including the plurality of logical extents. The I/O management includes allocating the physical blocks in the storage areas of the high-speed storage device 11 and the low-speed storage device 12 to the logical blocks in the storage area of the logical unit, and managing the state of allocation. The address translation table 1331 is used to manage the state of allocation. The dividing operation into the logical extents may be executed by the configuration management unit 1351. The I/O management also includes acquiring an access (I/O) statistical value (hereinafter, referred to as an access count) indicating the status of access to each logical extent. Access counts associated with respective logical extents are managed using the extent management table 1332.

The group management unit 1354 manages the strength of linkage of a respective combination of two different logical extents included in the plurality of logical extents, based on the degree of linkage of the respective combination that indicates a degree at which the two logical extents are sequentially accessed. The degree of linkage of each combination is managed using the link management table 1333. The group management unit 1354 further manages, as an extent group, a set of logical extents included in each series of combinations that mutually have a linkage relationship.

The tiering controller 1355 transfers (rearranges), to a physical extent in the high-speed storage device 11, data in a physical extent that is included in the low-speed storage device 12 and has a high frequency of access. Similarly, the tiering controller 1355 transfers, to a physical extent in the low-speed storage device 12, data in a physical extent that is included in the high-speed storage device 11 and has a low frequency of access.

FIG. 3 shows an exemplary relationship between the physical extents and the physical blocks in the embodiment. As shown in FIG. 3, the storage area of the high-speed storage device 11 is divided into m physical extents PE0, PE1, . . . , PEm−1. That is, the high-speed storage device 11 includes m physical extents PE0 to PEm−1. The storage area of the high-speed storage device 11 is further divided into m×n physical blocks PB0_0, . . . , PB0_$n$−1, PB1_0, . . . , PB1_$n$−1, . . . , PBm−1_0, . . . , PBm−1_n−1. That is, the high-speed storage device 11 includes m×n physical blocks PB0_0, . . . , PB0_$n$−1, PB1_0, . . . , PB1_$n$−1, . . . , PBm−1_0, . . . , PBm−1_n−1.

An i-th (i=0, 1, . . . , m−1) physical extent in the high-speed storage device 11 will hereinafter be referred to as physical extent PEi. Physical extent PEi includes n physical blocks PBi_0 to PBi_n−1 that are sequentially arranged in the storage area of the high-speed storage device 11. In other words, physical blocks PBi_0 to PBi_n−1 constitute the physical extent PEi. The sign "n" represents the above-mentioned first number, and is 8 in the embodiment where the extent size is 4 KB and the block size is 512 B.

The above-described relationship between the physical extents and the physical blocks in the high-speed storage device 11 is also applicable to the low-speed storage device 12. In a similar description associated with the low-speed storage device 12, it is sufficient if the above description is rewritten to change the high-speed storage device 11 to the low-speed storage device 12, and to change the sign "m" to another sign (for example, "d"). The sign "d" represents the number of physical extents in the low-speed storage device 12.

Physical extent PEi in the high-speed storage device 11 is denoted by, for example, physical extent number 0$i$. That is, physical extent number 0$i$ is an identifier for identifying physical extent PEi. Physical extent number 0$i$ is obtained by coupling, for example, storage number 0 to internal physical extent number i. Storage number 0 is used as an identifier (storage identifier) for identifying the high-speed storage device 11. Internal physical extent number i is used as an identifier (extent identifier) for identifying the i-th physical extent (namely, physical extent PEi) in a storage device denoted by storage number 0 (namely, the high-speed storage device 11).

J-th physical block PBi_j (j=0, 1, . . . , n−1) in physical extent PEi is denoted by physical extent number 0$i$ and offset OFSTj. Offset OFSTj represents the relative position of a j-th physical block (namely, physical block PBi_j) in physical extent PEi.

Similarly, k-th physical extent PEk (k=0, 1, . . . , h−1) in the low-speed storage device 12 is denoted by physical extent number 1$k$. Physical extent number 1$k$ is obtained by coupling storage number 1 and internal physical extent number k. Storage number 1 is used as an identifier that denotes the low-speed storage device 12. Internal physics extent number k is used as an identifier for identifying a k-th physical extent (namely, physical extent PEk) in a storage device denoted by storage number 1 (namely, the low-speed storage device 12).

J-th physical block PBk_j in physical extent PEk is denoted by physical extent number 1$k$ and offset OFSTj. Above-mentioned physical extent numbers 0$i$ and 1$k$ are unique in the entire physical storage area (physical address space) provided using the high-speed storage device 11 and the low-speed storage device 12.

FIG. 4 shows an exemplary relationship between the logical extents and the logical blocks in the embodiment. FIG. 4 shows a logical unit LU. The storage area (more specifically, the virtual storage area) of the logical unit LU is divided into u×n logical blocks LB0_0, . . . , LB0_$n$−1, LB1_0, . . . , LB1_$n$−1, . . . , LBu−1_0, . . . , LBu−1_n−1. That is, the logical unit LU includes u×n logical blocks LB0_0, . . . , LB0_$n$−1, LB1_0, . . . , LB1_$n$−1, . . . , LBu−1_0, . . . , LBu−1_n−1. Further, the storage area of the logical unit LU is divided into u logical extents LE0, . . . , LEu−1. That is, the logical unit LU includes u logical extents LE0 to LEu−1.

Assume here that the s-th logical extent (s=0, 1, . . . , u−1) in the logical unit LU is expressed as logical extent LEs. Logical extent LEs includes n logical blocks LBs_0 to LBs_n−1 continuously arranged in the storage area of the logical unit LU. In other words, logical blocks LBs_0 to LBs_n−1 constitute logical extent LEs. Logical blocks LBs_0 to LBs_n−1 are a (u×n)-th logical block to an (s+1)×(n−1)-th logical block in the logical unit LU, respectively.

In the embodiment, the storage controller 13 can recognize logical blocks LB0_0, . . . , LB0_$n$−1, LB1_0, . . . , LB1_$n$−1, . . . , LBu−1_0, . . . , LBu−1_n−1 in the logical unit LU, and logical extents LE0, . . . , LEu−1 in the logical unit LU. In contrast, the host 20 can recognize only logical blocks LB0_0, . . . , LB0_$n$−1, LB1_0, . . . , LB1_$n$−1, . . . , LBu−1_0, . . . , LBu−1_n−1. However, this may be modified such that the configuration management unit 1351 notifies the host 20 of definition contents associated with each logical extent and including a logical extent size thereof, thereby enabling the host 20 to recognize logical extents LE0 to LEu−1 in the logical unit LU.

The host 20 recognizes (designates) the t-th logical block (t=0, 1, . . . , u×(n−1)) in the logical unit LU, based on logical unit number LUN and logical block address LBAt (LBA=LBAt=t). Logical unit number LUN (for example, 0) is used as an identifier for denoting the logical unit LU, and logical block address LBAt is used as an address for indicating the t-th logical block in a logical unit (more specifically, logical unit LU denoted by logical unit number LUN).

The t-th logical block (namely, a logical block with logical block address LBAt=t) in logical unit LU is expressed as LBv_w (logical block LBv_w) where v (v=0, 1, . . . , n−1) represents the quotient of t/n, and w (w=0, 1, . . . , n−1) represents the residue of t/n. LBv_w denotes a w-th logical block in a v-th logical extent in logical unit LU.

As is evident, t is equal to v×n+w=(v+1)×n−(n−w). In the embodiment, the I/O management unit 1353 divides logical block address LBAt (=t) by n, thereby specifying logical extent LEv to which the logical block (LBv_w) designated by logical block address LBAt belongs, and the relative position w of the logical block in logical extent LEv.

FIG. 5 shows a data structure example of the address translation table 1331 shown in FIG. 2. The address translation table 1331 has a group of entries associated with all logical blocks of all logical units provided by, for example, the configuration management unit 1351. Each entry of the address translation table 1331 includes a logical unit number (LUN) field, a logical block address (LBA) field, a logical extent number (LEN) field, a physical extent number (PEN) field, and an offset field.

The LUN field is used to hold a logical unit number that denotes a logical unit including a corresponding logical block. The LBA field is used to hold the address (logical block address) of the corresponding logical block.

The LEN field is used to hold a logical extent number as an identifier for identifying a logical extent including the corresponding logical block. The logical extent number is unique in the entire logical storage area (logical address space), to which all logical units provided by the configuration management unit 1351 belong. The logical extent number includes a combination of the logical unit number and the internal logical extent number. The internal logical extent number is unique in the logical unit including the corresponding logical block, and is an identifier for identifying a logical extent that includes the corresponding logical block of the logical unit.

The PEN field is used to hold a physical extent number. The physical extent number denotes a physical extent allocated to the logical extent including the corresponding logical block (namely, a physical extent including a physical block allocated to the corresponding logical block). The offset field is used to hold an offset (offset data). The offset indicates the relative position of the physical block, allocated to the corresponding logical block, in the physical extent including the physical block.

FIG. 6 shows a data structure example of the extent management table 1332 shown in FIG. 2. The extent management table 1332 has a group of entries associated with all logical extents in all logical units provided by, for example, the configuration management unit 1351. Each entry of the extent management table 1332 includes a logical extent number (LEN) field, an extent group number (EGN) field, a preceding link extent (PLE) field, a succeeding link extent (SLE) field, an access count (AC) field, and a last access time (LAT) field.

The LEN field is used to hold a logical extent number that represents a corresponding logical extent. The EGN field is used to hold an extent group number as an identifier for identifying an extent group to which the corresponding logical extent belongs. In the example of the extent management table 1332 shown in FIG. 6, a value of 0 is set in the EGN fields of all entries. The value of 0 in the EGN field is an initial value, and indicates that the corresponding logical extent does not belong to the extent group. Therefore, it is assumed in the embodiment that the use of an extent group number of 0 is inhibited. However, the initial value of the EGN field is not limited to 0. It is sufficient if the initial value is a particular value other than usable extent group numbers.

The PLE field and the SLE field are used to hold logical extent numbers allocated to a preceding link extent and a succeeding link extent, respectively. The preceding link extent indicates a logical extent accessed immediately before the corresponding logical extent. Similarly, the succeeding link extent indicates a logical extent accessed immediately after the corresponding logical extent.

In the example of the extent management table 1332 shown in FIG. 6, a value of 0 is set in the PLE fields and the SLE fields of all entries. The value of 0 in the PLE fields and the SLE fields is an initial value, and indicates that the corresponding logical extent does not have any preceding or succeeding logical extent in order of access. In view of this, it is assumed in the embodiment that the use of the logical extent number of 0 is inhibited. However, the initial value of the PLE field and the SLE field is not limited to 0. It is sufficient if the initial value is a particular value other than usable logical extent numbers.

If a particular value other than the initial value and the logical extent number, for example, −1, is set in the PLE field, this particular value (−1) indicates that the corresponding logical extent has no preceding logical extent in order of access. Similarly, if −1 is set in the SLE field, the particular value (−1) indicates that the correcting logical extent does not have any succeeding logical extent in order of access. Further, different particular values (e.g., −1 and −2), which differ from the initial value and the logical extent number, may be set in the PLE field and the SLE field, respectively.

The AC field is used to hold an access count (access frequency) that indicates the number of accesses to the corresponding logical extent. The LAT field is used to hold last access time data that indicates the time (date and time) when the corresponding logical extent is last accessed.

Respective entries of the extent management table 1332 are initialized as follows: First, the logical extent numbers of logical extents associated with the respective entries are set in the LEN fields of the respective entries. 0, for example, is set in the other fields of the respective entries. FIG. 6 shows the initialized extent management table 1332.

Figure 7:
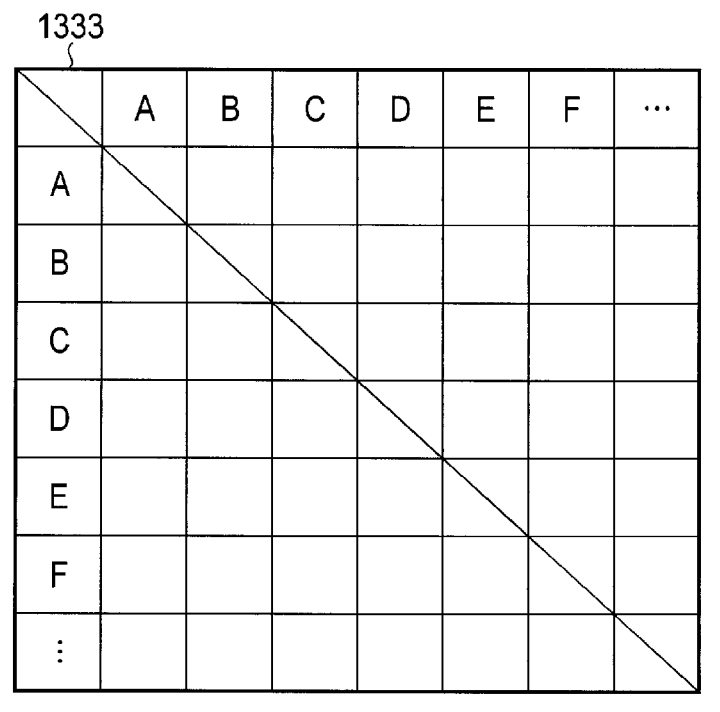

FIG. 7 shows a data structure example of the link management table 1333 shown in FIG. 2. The link management table 1333 has a matrix data structure. That is, the link management table 1333 has a plurality of items arranged in rows and columns. In the respective row items, unique logical extent numbers are set. In the respective column items, unique logical extent numbers are set. The number of row items is identical to that of column items. Further, in the embodiment, the order of the logical extent numbers in all rows coincides with the order of logical extent numbers in all columns.

In FIGS. 7, A, B, C, D, E and F represent the logical extent numbers of respective logical extents A, B, and C, D, E and F, respectively. Assume here that an x-th row (x=1, 2, . . . ) and a y-th row (y=1, 2, . . . , y≠x) in the matrix correspond to extent number X (X=A, B, C, D, E, F, . . . ) and extent number Y (Y=A, B, C, D, E, F, . . . , Y≠X), respectively, and therefore that the x-th column and the y-th column in the matrix also correspond to extent numbers X and Y, respectively. Logical extents represented by extent numbers X and Y will hereinafter be referred to as logical extents X and Y, respectively.

The position (x, y) of the x-th row and the y-th column in the matrix, namely, entry (x, y) of the x-th row and the y-th column in the link management table 1333, is used to hold the number of accesses to, for example, logical extent Y immediately before or after accesses to logical extent X. Similarly, the position (y, x) of the y-th row and the x-th column in the matrix, namely, entry (y, x) of the y-th row and the x-th column in the link management table 1333, is used to hold the number of accesses to, for example, logical extent X immediately before or after accesses to logical extent Y.

The numbers held in entries (x, y) and (y, x) are identical to each other. These numbers indicate the number of successive accesses to logical extents X and Y in this order or vice versa. This number indicates the strength of association (namely, the strength of linkage) of logical extents X and Y in successive accesses. Thus, this number will hereinafter be referred to as a degree of linkage. The degree of linkage in each of entries (x, y) and (y, x) is incremented by 1 by the group management unit 1354, when logical extent Y is accessed immediately after logical extent X, or when logical extent X is accessed immediately after logical extent Y.

The initial value (namely, the initial degree of linkage) in entries (x, y) and (y, x) in the link management table 1333 is, for example, 0. In the link management table 1333 shown in FIG. 7, blank entries indicate entries where a linkage degree of 0 is set. If necessary, a value of 0 may be set in the blank entries of the link management table 1333.

In the embodiment, the link management table 1333 has a matrix structure. However, the link management table 1333 may have an arrangement of linkage degrees corresponding to all combinations of logical extents that have a linkage relationship (namely, a list structure).

Referring next to FIG. 8, a description will be given of the operation of the embodiment, using access processing as an example. FIG. 8 is a flowchart showing an exemplary procedure of the access processing. Assume first that the host 20 has issued an access request to the storage controller 13 of the tiered storage system 10 through the host interface bus 30.

The HIF controller 131 of the storage controller 13 receives, from the host interface bus 30, the access request issued by the host 20. The access request includes logical unit number LUN, logical block address LBAt, and data transfer size. The data transfer size indicates the number of logical blocks to be transferred (accessed). If the data transfer size is N, the access request designates an access to a range of successive N logical blocks that begins with logical block address LBAt.

The I/O management unit 1353 of the storage controller 13 specifies a logical extent range corresponding to the logical block range designated by the received access request, as described below (step S1). First, the I/O management unit 1353 refers to entries in the address translation table 1331 associated with combinations of logical unit numbers and logical block addresses indicating respective logical blocks in the designated logical block range. After that, the I/O management unit 1353 determines logical extents denoted by the logical extent numbers associated with the respective logical blocks included in the designated logical block range. Thus, the I/O management unit 1353 specifies the logical extent range corresponding to the designated logical block range. Since the specified logical extent range corresponds to the logical block range designated by the access request from the host 20, it can be regarded as (indirectly) designated by the access request from the host 20.

Upon specifying of the logical extent range (step S1), the group management unit 1354 is started. The group management unit 1354 performs, in cooperation with the I/O management unit 1353, table update processing for updating the extent management table 1332 and the link management table 1333 based on the specified logical extent range (step S2).

Referring now to FIG. 9, the table update processing (step S2) will be described in detail. FIG. 9 is a flowchart showing an exemplary procedure of the table update processing. First, the group management unit 1354 refers to a particular area in the memory 133 (step S21). This particular area is used to store the logical extent number of a logical extent last processed in the access processing shown by the flowchart of FIG. 8, as will be described later.

Next, the group management unit 1354 determines whether a valid logical extent number is stored in the particular area in the memory 133 (step S22). If no valid logical extent number is stored (No in step S22), the group management unit 1354 determines that the current access processing is access processing performed first after the initialization of the extent management table 1332 and the link management table 1333. In this case, the group management unit 1354' selects, as LE1 (logical extent LE1), a leading logical extent in the specified logical extent range (step S23). After that, the group management unit 1354 performs first table update processing (step S24), thereby completing the table update processing according to the flowchart of FIG. 9.

In contrast, if a valid logical extent number (LENz) is stored in the particular area (Yes in step S22), the group management unit 1354 determines that access processing preceding to the current access processing has already been executed, and that the LENz denotes a logical extent last processed (accessed) in the preceding access processing. In this case, the group management unit 1354 selects, as LE1, the logical extent denoted by the LENz (step S25). Further, the group management unit 1354 selects, as LE2 (logical extent LE2), a leading logical extent in the specified logical extent range (step S26). After that, the group management unit 1354 performs second table update processing (step S27), thereby completing the table update process according to the flowchart of FIG. 9.

Figure 10:
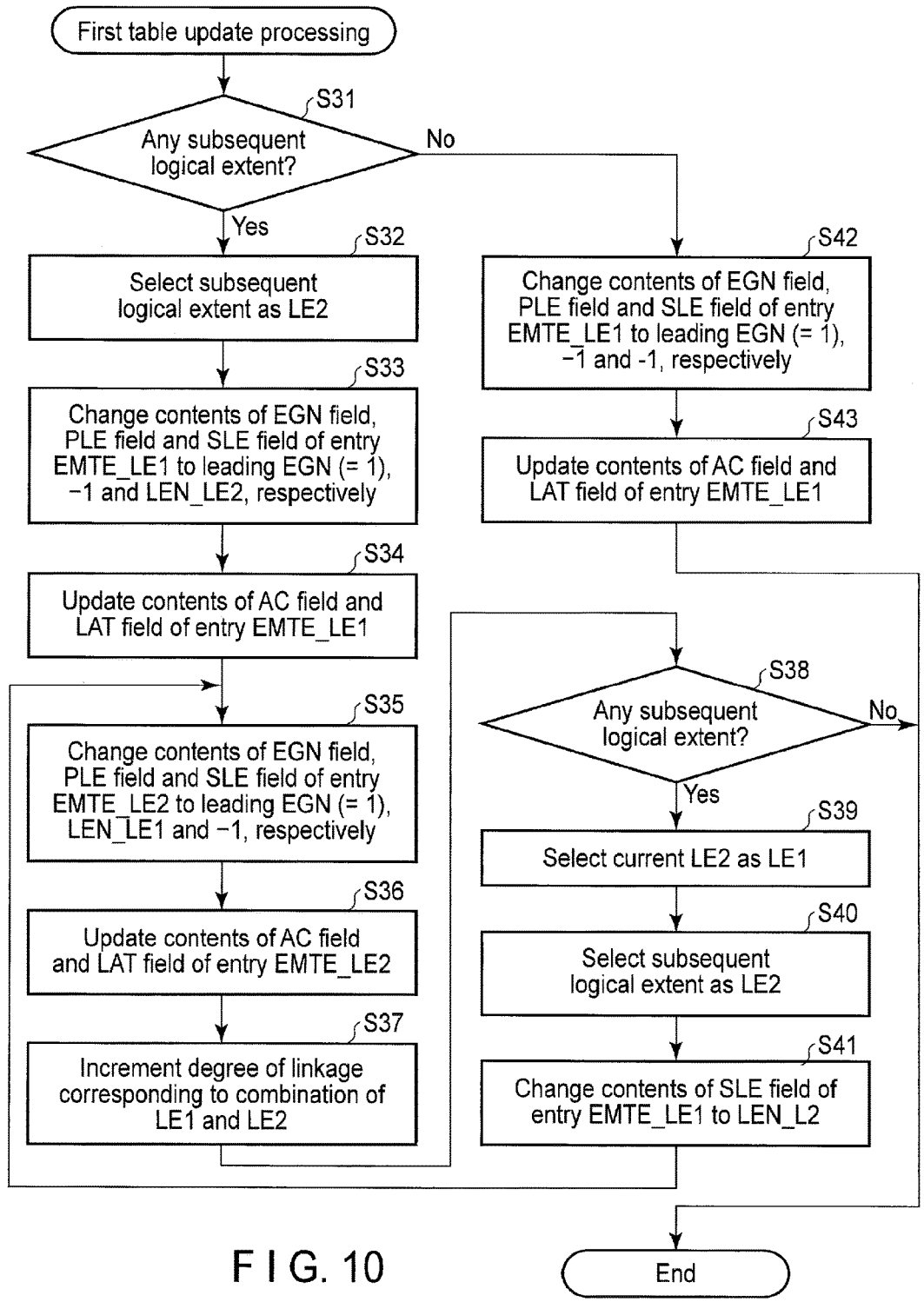
FIG. 10 is a flowchart showing an exemplary procedure of first table update processing included in the table update processing of FIG. 9.

Referring then to FIG. 10, the first table update processing (step S24) will be described in detail. FIG. 10 is a flowchart showing an exemplary procedure of the first table update processing. Step S23 of FIG. 9 may be performed at the beginning of the first table update processing.

The group management unit 1354 first determines whether a logical extent subsequent to current logical extent LE1 (namely, the logical extent selected in step S23 of FIG. 9) exists in the specified logical extent range (step S31). If the specified logical extent range includes a plurality of logical extents, the subsequent logical extent exists (Yes in step S31). In this case, the group management unit 1354 selects the subsequent logical extent as LE2 (step S32). Hereinafter, the logical extent numbers (LENs) of LE1 and LE2 will be referred to as LEN_LE1 and LEN_LE2, respectively. Furthermore, entries in the extent management table 1332 associated with LE1 and LE2 will be referred to as EMTE_LE1 and EMTE_LE2, respectively.

Next, the group management unit 1354 changes the contents (initial values 0) of the EGN field, the PLE field and the SLE field of entry EMTE_LE1 to the leading EGN (=1), −1 and LEN_LE2, respectively (step S33). At this time, an EGN other than the leading EGN may be used. On the other hand, the I/O management unit 1353 updates the contents of the AC field and the LAT field of entry EMTE_LE1 (step S34). That is, the I/O management unit 1353 increments, by 1, the contents (initial value 0) of the AC field, and updates the contents (initial value 0) of the LAT field so as to indicate a current time.

Next, the group management unit 1354 changes the contents (initial values 0) of the EGN field, the PLE field and the SLE field of entry EMTE_LE2, to the leading EGN (=1), LEN_LE1 and −1, respectively (step S35). Further, the group management unit 1354 updates the contents of the AC field and the LAT field of entry EMTE_LE2 (step S36). The group management unit 1354 increments, by 1, the contents (degree of linkage) of an entry of the link management table 1333 associated with the combination of LE1 and LE2 (step S37).

Next, the group management unit 1354 determines whether a subsequent logical extent (namely, a logical extent subsequent to current logical extent LE2) exists in the specified logical extent range (step S38). If no subsequent logical extent exists (No in step S38), the group management unit 1354 completes the first table update processing (step S24 of FIG. 9) according to the flowchart of FIG. 10. That is, the group management unit 1354 completes the table update processing (step S2 of FIG. 8) according to the flowchart of FIG. 9.

In contrast, if a subsequent logical extent exists (Yes in step S38), the group management unit 1354 selects current LE2 as new LE1 (step S39). Moreover, the group management unit 1354 selects, as new LE2, the subsequent logical extent (namely, a logical extent subsequent to new LE1) in the specified logical extent range (step S40).

Next, the group management unit 1354 changes, from −1 to LEN_LE2, the contents of the SLE field of entry EMTE_LE1 associated with new LE1 (namely, entry EMTE_LE2 associated with preceding LE2) (step S41). After that, the group management unit 1354 returns to step S35.

In step S31, assume that no subsequent logical extent exists. That is, the specified logical extent range includes only a single logical extent. In this case (No in step S31), the group management unit 1354 changes the contents of the EGN field, the PLE field and the SLE field of entry EMTE_LE1 to the leading EGN (=1), −1 and −1, respectively (step S42). On the other hand, the I/O management unit 1353 updates the contents of the AC field and the LAT field of entry EMTE_LE1, as in step S34 (step S43). This is the termination of the first table update processing (step S24 of FIG. 9) of the group management unit 1354 according to the flowchart of FIG. 10.

Referring next to FIG. 11, second table update processing (step S27 of FIG. 9) will be described in detail. FIG. 11 is a flowchart showing an exemplary procedure of the second table update processing. Steps S25 and S26 of FIG. 9 may be performed at the beginning of the second table update processing.

First, the group management unit 1354 acquires contents LEN_SLE (LE1) of the SLE field of entry EMTE_LE1 and contents LEN_PLE (LE2) of the PLE field of entry EMTE_LE2 from entries EMTE_LE1 and EMTE_LE2 associated with current LE1 and LE2 (step S51). Next, the group management unit 1354 changes the contents of the SLE field of entry EMTE_LE1 to LEN_LE2 (step S52).

After that, the group management unit 1354 changes the current contents of the EGN field and the SLE field of entry EMTE_LE2 in accordance with the contents of the EGN field and the SLE field of entry EMTE_LE2 (step S53). Step S53 will now be described in detail.

In step S53, the group management unit 1354 determines whether the contents of the EGN field of entry EMTE_LE2 differs from EGN_LE1 (=EGNα) indicating extent group (EGα) to which LE1 belongs. If so, the group management unit 1354 changes the contents of the EGN field to EGNα. Further, in step S53, if the contents of the SLE field of entry EMTE_LE2 is the initial value of 0, the group management unit 1354 changes the contents of the SLE field to −1.

Assume here that the contents of the EGN field of entry EMTE_LE2 differs from EGNα, and also differs from the initial value of 0. That is, assume that LE2 belongs to extent group EGβ different from EGα. In this case, the group management unit 1354 changes the contents of the SLE field of entry EMTE_LE2 to −1, even if the contents of the SLE field assumes a value other than the initial value of 0 (and −1), that is, even if it is the logical extent number of logical extent LEγ belonging to EGβ. In order to cancel the linkage of LE2 and LEγ, the group management unit 1354 changes, to the initial value of 0, the contents of an entry of the link management table 1333 associated with the combination of LE2 and LEγ.

After executing step S53, the group management unit 1354 proceeds to step S54. In step S54, the group management unit 1354 changes the contents of the PLE field of entry EMTE_LE2 to LEN_LE1. On the other hand, the I/O management unit 1353 updates the contents of the AC field and the LAT field of entry EMTE_LE2, as in step S34 (step S55).

At this time, the group management unit 1354 increments, by 1, the degree of linkage corresponding to the combination of LE1 and LE2 (step S56). Next, the group management unit 1354 determines whether acquired LEN_SLE (LE1) differs from LEN_LE2, and is other than −1 (more specifically, other than −1 and 0) (step S57). Hereinafter, a logical extent denoted by LEN_SLE (LE1) will be referred to as LEs.

If the answer in step S57 is Yes, the group management unit 1354 determines that it is necessary to cancel the linkage of LEs and LE1, in order to link LE2 to LE1. Therefore, the group management unit 1354 delinks LEs from LE1 (step S58). That is, the group management unit 1354 changes (sets), to 0, the degree of linkage corresponding to the combination of LEs and LE1, and changes, to −1, the contents of the PLE field of entry EMTE_LEs. After that, the group management unit 1354 proceeds to step S59. In contrast, if the answer in step S57 is No, the group management unit 1354 skips step S58 and proceeds to step S59.

In step S59, the group management unit 1354 determines whether acquired LEN_PLE (LE2) differs from LEN_LE1, and is other than −1 (more specifically, other than −1 and 0). Hereinafter, a logical extent denoted by LEN_PLE (LE2) will be referred to as LEp.

If the answer in step S59 is Yes, the group management unit 1354 determines that it is necessary to cancel the linkage of LEp and LE1, in order to link LE2 to LE1. Therefore, the group management unit 1354 delinks LEp from LE1 (step S60). That is, the group management unit 1354 changes, to 0, the degree of linkage corresponding to the combination of LEp and LE1, and changes, to −1, the contents of the SLE field of entry EMTE_LEp.

Next, the group management unit 1354 determines whether LEN_SLE (LE1) is equal to LEN_PLE (LE2) (step S61). In the flowchart of FIG. 11, step S61 is executed regardless of the determination result of step S57, if the answer in step S59 is Yes. However, step S60 may be executed if the answers in steps S57 and S59 are both Yes.

If LEN_SLE (LE1) is equal to LEN_PLE (LE2) (Yes in step S61), the group management unit 1354 determines that LEs and LEp denote the same logical extent, and LEs (=LEp) is to be delinked from the extent group to which LE1 and LE2 belong. In this case, the group management unit 1354 changes the contents of the EGN field of entry EMTE_LEs (=LEp) to an EGN that denotes a new extent group (step S62).

Next, the group management unit 1354 determines whether a subsequent logical extent (namely, a logical extent subsequent to current logical extent LE2) exists in the specified logical extent range (step S63). If no subsequent logical extent exists (No in step S63), the group management unit 1354 completes the second table update processing (step S27 of FIG. 9) according to the flowchart of FIG. 11. That is, the group management unit 1354 completes the table update processing (step S2 of FIG. 8) according to the flowchart of FIG. 9.

In contrast, if the subsequent logical extent exists (Yes in step S63), the group management unit 1354 selects current LE2 as new LE1 (step S64). Moreover, the group management unit 1354 selects, as new LE2, a subsequent logical extent in the specified logical extent range (step S65). After that, the group management unit 1354 returns to step S51.

Referring then to FIGS. 12 and 13, in addition to FIGS. 6 and 7, a description will be given of a specific example of the above-described table update processing, using a first case as an example. The first case is that where table update processing (step S2 of FIG. 8) is performed in accordance with a first access request from the host 20. In this case, assume that the extent management table 1332 and the link management table 1333 are set in the initial states shown in FIGS. 6 and 7, respectively. FIGS. 12 and 13 show examples of the extent management table 1332 and the link management table 1333 obtained after table update processing is executed in response to the first access request.

First, assume that a logical extent range, which is specified based on the first access request, covers two logical extents A and B, and logical extent B succeeds logical extent A. In this case, the group management unit 1354 selects logical extent A as LE1 (step S23 of FIG. 9). After that, the group management unit 1354 performs, in cooperation with the I/O management unit 1353, the first table update processing (step S24 of FIG. 9) in accordance with the flowchart of FIG. 10, as described below.

First, the group management unit 1354 selects, as LE2, logical extent B succeeding logical extent A (steps S31 and S32). Next, the group management unit 1354 changes the contents of the EGN field, the PLE field and the SLE field of entry EMTE_A associated with logical extent A (=LE1) from 0, 0 and 0 shown in FIG. 6 to 1 (leading EGN), −1 and B shown in FIG. 12, respectively (step S33). The leading EGN is determined by the group management unit 1354. On the other hand, the I/O management unit 1353 increments, by 1, the contents of the AC count field of entry EMTE_A from 0 shown in FIG. 6 to 1 shown in FIG. 12, and updates the contents of the LAT field of entry EMTE_A to indicate the current time (step S34).

Subsequently, the group management unit 1354 changes the contents of the EGN field, the PLE field and the SLE field of entry EMTE_B associated with logical extent B (=LE2) from 0, 0 and 0 shown in FIG. 6 to 1 (leading EGN), A and −1 shown in FIG. 12, respectively (step S35). On the other hand, the I/O management unit 1353 increments, by 1, the contents of the AC count field of entry EMTE_B from 0 shown in FIG. 6 to 1 shown in FIG. 12, and updates the contents of the LAT field of entry EMTE_B to indicate the current time (step S36).

Then, the group management unit 1354 increments, by 1, the degree of linkage in entries (A, B) and (B, A) of the linkage management table 1333 associated with logical extents A and B, from 0 (indicated by the blank space) shown in FIG. 7 to 1 shown in FIG. 13 (step S37). The group management unit 1354 stores, as valid logical extent number LENz in the particular area of the memory 133, logical extent number B of logical extent B (namely, last logical extent B in the logical extent range specified based on the first access request) last processed in the above-described access processing including the table update processing (step S18 of FIG. 8).

Referring next to FIGS. 14 and 15, in addition to FIGS. 12 and 13, a specific example of the above-described table update processing will be described using a second case as an example. The second case is that where table update processing (step S2 of FIG. 8) is performed in accordance with a second access request issued from the host 20 after the first access request. At this time, the extent management table 1332 and the link management table 1333 assume the states shown in FIGS. 12 and 13, respectively. FIGS. 14 and 15 show examples of the extent management table 1332 and the link management table 1333 obtained after table update processing is executed in response to the second access request.

Assume here that a logical extent range, which is specified from the second access request, covers two logical extents C and D, and logical extent D succeeds logical extent C. At this time, logical extent number B of logical extent B is stored in the particular area of the memory 133. Logical extent B is the last logical extent in the logical extent range specified based on the first access request. As is evident, logical extent B precedes logical extent C in order of access, and logical extent C succeeds logical extent B in order of access. That is, logical extents B and C are successive in order of access.

In this case, the group management unit 1354 selects logical extents B and C as LE1 and LE2, respectively (steps S25 and S26 of FIG. 9). Then, the group management unit 1354 performs, in cooperation with the I/O management unit 1353, the second table update processing (step S27 of FIG. 9) in accordance with the flowchart of FIG. 11, as described below.

The group management unit 1354 changes the contents of the SLE field of entry EMTE_B of the extent management table 1332 associated with logical extent B (=LE1), from −1 shown in FIG. 12 to C shown in FIG. 14 (step S52). The group management unit 1354 also changes the contents of the EGN field and the SLE field of entry EMTE_C of the extent management table 1332 associated with logical extent C (=LE2), from 0 and 0 shown in FIG. 12 to 1 (namely, the EGN of an extent group including preceding logical extent B) and −1 shown in FIG. 14, respectively (step S53).

The group management unit 1354 further changes the contents of the PLE field of entry EMTE_C from 0 shown in FIG. 12 to B shown in FIG. 14 (step S54). On the other hand, the I/O management unit 1353 increments, by 1, the contents of the AC count field of entry EMTE_C from 0 shown in FIG. 12 to 1 shown in FIG. 14, and updates the contents of the LAT field of entry EMTE_C to indicate the current time (step S55). Then, the group management unit 1354 increments, by 1, the degree of linkage in entries (B, C) and (C, B) of the linkage management table 1333 associated with logical extents B and C, from 0 (indicated by the blank space) shown in FIG. 13 to 1 shown in FIG. 15 (step S56).

Then, the group management unit 1354 selects logical extents C and D as LE1 and LE2, respectively (steps S64 and S65 of FIG. 11). Further, the group management unit 1354 changes the contents of the SLE field of entry EMTE_C from −1 to D as shown in FIG. 14 (step S52). The group management unit 1354 also changes the contents of the EGN field and the SLE field of entry EMTE_D of the extent management table 1332 associated with logical extent D, from 0 and 0 shown in FIG. 12 to 1 (namely, the EGN of the extent group including preceding logical extent C) and −1 shown in FIG. 14, respectively (step S53).

The group management unit 1354 further changes the contents of the PLE field of entry EMTE_D from 0 shown in FIG. 12 to C shown in FIG. 14 (step S54). On the other hand, the I/O management unit 1353 increments, by 1, the contents of the AC count field of entry EMTE_D from 0 shown in FIG. 12 to 1 shown in FIG. 14, and updates the contents of the LAT field of entry EMTE_D to indicate the current time (step S55).

Subsequently, the group management unit 1354 increments, by 1, the degree of linkage in entries (C, D) and (D, C) of the linkage management table 1333 associated with logical extents C and D, from 0 (indicated by the blank space) shown in FIG. 13 to 1 shown in FIG. 15 (step S56). The group management unit 1354 stores, in the particular area of the memory 133, logical extent number D of logical extent D last processed in the above-described access processing including the table update processing (step S18 of FIG. 8).

Referring next to FIGS. 16 and 17, in addition to FIGS. 14 and 15, a description will be given of a specific example of the above-described table update processing, using a third case as an example. The third case is that where table update processing (step S2 of FIG. 8) is performed in accordance with a third access request issued from the host 20 after the second access request. At this time, the extent management table 1332 and the link management table 1333 assume the states shown in FIGS. 14 and 15, respectively. FIGS. 16 and 17 show examples of the extent management table 1332 and the link management table 1333 obtained after table update processing is executed in response to the third access request.

Assume here that a logical extent range, which is specified based on the third access request, covers two logical extents A and B. At this time, logical extent number D of logical extent D is stored in the particular area of the memory 133. Logical extent D is the last logical extent in the logical extent range specified based on the second access request. As is evident, logical extents D and A are successive in order of access.

In this case, the group management unit 1354 selects logical extents D and A as LE1 and LE2, respectively (steps S25 and S26 of FIG. 9). Subsequently, the group management unit 1354 performs, in cooperation with the I/O management unit 1353, the second table update processing (step S27 of FIG. 9) in accordance with the flowchart of FIG. 11, as described below.

The group management unit 1354 changes the contents of the SLE field of entry EMTE_D of the extent management table 1332 associated with logical extent D (=LE1), from −1 shown in FIG. 14 to A shown in FIG. 16 (step S52). At this time, the group management unit 1354 changes neither of the contents (1 and B) of the EGN field and the SLE field of entry EMTE_A of the extent management table 1332, associated with logical extent A (=LE2) (step S53).

The group management unit 1354 also changes the contents of the PLE field of entry EMTE_A from −1 shown in FIG. 14 to D shown in FIG. 16 (step S54). On the other hand, the I/O management unit 1353 increments, by 1, the contents of the AC count field of entry EMTE_A from 1 shown in FIG. 14 to 2 shown in FIG. 16, and updates the contents of the LAT field of entry EMTE_A to indicate the current time (step S55). After that, the group management unit 1354 increments, by 1, the degree of linkage in entries (D, A) and (A, D) of the linkage management table 1333 associated with logical extents D and A, from 0 (indicated by the blank space) shown in FIG. 15 to 1 shown in FIG. 17 (step S56).

After that, the group management unit 1354 selects logical extents A and B as LE1 and LE2, respectively (steps S64 and S65). Next, the group management unit 1354 acquires contents LEN_SLE (A) of the SLE field of entry EMTE_A and contents LEN_PLE (B) of the PLE field of entry EMTE_B from entries EMTE_A and EMTE_B associated with logical extent A (=LE1) and logical extent B (=LE2), respectively (step S51). Acquired LEN_SLE (A) and LEN_PLE (B) are B and A, respectively, as is shown in FIG. 14. That is, logical extents B and A have already been registered as the succeeding link extent of logical extent A and the preceding link extent of logical extent B in the extent management table 1332, respectively. This means that logical extents A and B have already been linked to each other.

In such a case, the group management unit 1354 skips steps S52 and S54, although this process is omitted from the flowchart of FIG. 11. As a result, as is shown in FIG. 16, the group management unit 1354 maintains contents LEN_SLE (A) and LEN_PLE (B) of the SLE field of entry EMTE_A and the PLE field of entry EMTE_B in the current states (namely, B and A shown in FIG. 14). At this time, the group management unit 1354 changes neither of the contents (1 and C) of the EGN field and the SLE field of entry EMTE_B (step S53).

Steps S52 and S54 may be executed, because B is reset in the SLE field of entry EMTE_A by the execution of step S52, and A is reset in the PLE field of entry EMTE_B by the execution of step S54. That is, even if steps S52 and S54 are executed, the contents of the SLE field of entry EMTE_A and the PLE field of entry EMTE_B is maintained at B and A, respectively.

On the other hand, the I/O management unit 1353 increments, by 1, the contents of the AC count field of entry EMTE_B from 1 shown in FIG. 14 to 2 shown in FIG. 16, and updates the contents of the LAT field of entry EMTE_B to indicate the current time (step S55). Subsequently, the group management unit 1354 increments, by 1, the degree of linkage in entries (A, B) and (B, A) of the linkage management table 1333 associated with logical extents A and B, from 1 shown in FIG. 15 to 2 shown in FIG. 17 (step S56). The group management unit 1354 stores, in the particular area of the memory 133, logical extent number B of logical extent B last processed in the above-described access processing including the table update processing (step S18 of FIG. 8).

Referring next to FIGS. 18 and 19, in addition to FIGS. 16 and 17, a description will be given of a specific example of the above-described table update processing, using a fourth case as an example. The fourth case is that where table update processing (step S2 of FIG. 8) is performed in accordance with a fourth access request issued from the host 20 after the third access request. At this time, the extent management table 1332 and the link management table 1333 assume the states shown in FIGS. 16 and 17, respectively. FIGS. 18 and 19 show examples of the extent management table 1332 and the link management table 1333 obtained after table update processing is executed in response to the fourth access request.

Assume here that a logical extent range, which is specified based on the fourth access request, covers two logical extents D and E. At this time, logical extent number B of logical extent B is stored in the particular area of the memory 133. Logical extent B is the last logical extent in the logical extent range specified based on the third access request. As is evident, logical extents B and D are successive in order of access.

In this case, the group management unit 1354 selects logical extents B and D as LE1 and LE2, respectively (steps S25 and S26 of FIG. 9). Subsequently, the group management unit 1354 performs, in cooperation with the I/O management unit 1353, the second table update processing (step S27 of FIG. 9) in accordance with the flowchart of FIG. 11, as described below.

First, the group management unit 1354 acquires contents LEN_SLE (B) of the SLE field of entry EMTE_B and contents LEN_PLE (D) of the PLE field of entry EMTE_D from entries EMTE_B and EMTE_D associated with logical extents B (=LE1) and D (=LE2) (step S51). Acquired LEN_SLE (B) and LEN_PLE (D) are both C. That is, logical extent C has already been registered as the succeeding link extent of logical extent B and as the preceding link extent of logical extent D in the extent management table 1332. This means that logical extents B and C have already been linked to each other, and logical extents C and D have also already been linked to each other.

Next, the group management unit 1354 changes the contents of the SLE field of entry EMTE_B of the extent management table 1332 associated with logical extent B, from C shown in FIG. 16 to D shown in FIG. 18 (step S52). At this time, the group management unit 1354 changes neither of the contents (1 and A) of the EGN field and the SLE field of entry EMTE_D of the extent management table 1332, associated with logical extent D (step S53).

The group management unit 1354 further changes the contents of the PLE field of entry EMTE_D from C shown in FIG. 16 to B shown in FIG. 18 (step S54). On the other hand, the I/O management unit 1353 increments, by 1, the contents of the AC count field of entry EMTE_D from 1 shown in FIG. 16 to 2 shown in FIG. 18, and updates the contents of the LAT field of entry EMTE_D to indicate the current time (step S55). Then, the group management unit 1354 increments, by 1, the degree of linkage in entries (B, D) and (D, B) of the linkage management table 1333 associated with logical extents B and D, from 0 (indicated by the blank space) shown in FIG. 17 to 1 shown in FIG. 19 (step S56).

Next, the group management unit 1354 determines whether acquired LEN_SLE (B) differs from LEN_D (=D), and whether it is other than −1 (step S57). In this example, acquired LEN_SLE (B) is C, which differs from LEN_D (=D) and is other than −1 (Yes in step S57).

In this case, the group management unit 1354 determines that it is necessary to cancel the linkage of logical extent C indicated by LEN_SLE (B) and logical extent B in order to link logical extent D to logical extent B. Therefore, the group management unit 1354 delinks logical extent C (=LEs) from logical extent B (=LE1) (step S58). That is, the group management unit 1354 changes the degree of linkage corresponding to the combination of logical extents C and B from 1 shown in FIG. 17 to 0 shown in FIG. 19, and changes the contents of the PLE field of entry EMTE_C from B shown in FIG. 16 to −1 shown in FIG. 18.

Next, determines whether acquired LEN_PLE (D) differs from LEN_B (=B), and whether it is other than −1 (step S59). In this example, acquired LEN_PLE (D) is C, which differs from LEN_B (=B) and is other than −1 (Yes in step S59).

In this case, the group management unit 1354 determines that it is necessary to cancel the linkage of logical extent C indicated by LEN_PLE (D) and logical extent D, in order to link logical extent D to logical extent B. Therefore, the group management unit 1354 delinks logical extent C (=LEp) from logical extent D (=LE2) (step S60). That is, the group management unit 1354 changes the degree of linkage corresponding to the combination of logical extents C and D from 1 shown in FIG. 17 to 0 shown in FIG. 19, and changes the contents of the SLE field of entry EMTE_C from D shown in FIG. 16 to −1 shown in FIG. 18.

Next, the group management unit 1354 determines whether acquired LEN_SLE (B) and LEN_PLE (D) are equal to each other (step S61). In this example, acquired LEN_SLE (B) and LEN_PLE (D) are both C, and are therefore equal (Yes in step S61). This means that the logical extent (LEs) delinked from logical extent B (=E1) in step S58 is logical extent C that is equal to the logical extent (LEp) delinked from logical extent D (=LE2) in step S60. Therefore, in order to delink logical extent C from the extent group including logical extents B and D, the group management unit 1354 changes the contents of the EGN field of entry EMTE_C from 1 shown in FIG. 16 to an EGN (for example, 2 shown in FIG. 18) that indicates a new extent group (step S62).

After that, the group management unit 1354 selects logical extents D and E as LE1 and LE2, respectively (steps S64 and S65). Subsequently, the group management unit 1354 acquires contents LEN_SLE (D) of the SLE field of entry EMTE_D and contents LEN_PLE (E) of the PLE field of entry EMTE_D from entries EMTE_D and EMTE_E associated with logical extent D (=LE1) and logical extent E (=LE2), respectively (step S51). Acquired LEN_SLE (D) and LEN_PLE (E) are A and 0, respectively, as is shown in FIG. 16.

Next, the group management unit 1354 changes the contents of the SLE field of entry EMTE_D from A shown in FIG. 16 to E shown in FIG. 18 (step S52). The group management unit 1354 also changes the contents of the EGN field and the SLE field of entry EMTE_E from 0 and 0 shown in FIG. 16 to 1 and −1 shown in FIG. 18, respectively (step S53).

The group management unit 1354 further changes the contents of the PLE field of entry EMTE_E from 0 shown in FIG. 16 to D shown in FIG. 18 (step S54). On the other hand, the I/O management unit 1353 increments, by 1, the contents of the AC count field of entry EMTE_E from 0 shown in FIG. 16 to 1 shown in FIG. 18, and updates the contents of the LAT field of entry EMTE_E to indicate the current time (step S55). The group management unit 1354 also increments, by 1, the degree of linkage in entries (D, E) and (E, D) of the linkage management table 1333 associated with logical extents D and E, from 0 (indicated by the blank space) shown in FIG. 17 to 1 shown in FIG. 19 (step S56).

As described above, acquired LEN_SLE (D) is A, which differs from LEN_E (=E) and is other than −1 (Yes in step S57). In this case, the group management unit 1354 determines that it is necessary to cancel the linkage of logical extent A indicated by LEN_SLE (D) and logical extent D, in order to link logical extent E to logical extent D. Therefore, the group management unit 1354 delinks logical extent A (=LEs) from logical extent D (=LE1) (step S58). That is, the group management unit 1354 changes the degree of linkage corresponding to the combination of logical extents A and D from 1 shown in FIG. 17 to 0 shown in FIG. 19, and changes the contents of the PLE field of entry EMTE_A from D shown in FIG. 16 to −1 shown in FIG. 18. In the embodiment, current LE2, namely, logical extent E, is the last logical extent in the specified logical extent range (No in step S63). Therefore, the group management unit 1354 completes the second table update processing (step S27 in FIG. 9). That is, the group management unit 1354 completes the table update processing (step S2 in FIG. 8).

Return to the flowchart of FIG. 8. Upon the execution of the table update processing (step S2), the I/O controller 1352 is started. First, the I/O controller 1352 sets, as variable e, the number of logical extents in the specified logical extent range, in order to execute an access requested by the received access request (step S3). Variable e represents the number of logical extents to be accessed (namely, logical extents access to which is incomplete).

Next, the I/O controller 1352 selects one logical extent (namely, a target logical extent), to be subsequently accessed, from logical extents, the number of which is indicated by variable e (step S4). Next, the I/O controller 1352 accesses, as described below, physical blocks allocated to respective ones of all logical blocks which are included in the target logical extent and to be accessed (step S5). Assume here that the number of logical blocks to be accessed in the target logical extent is c. In this case, the number of physical blocks allocated to the c logical blocks is also c.

First, the I/O controller 1352 acquires a combination of the physical extent number and the offset of a physical block (that is, a leading physical block) allocated to a leading logical block included in all logical blocks to be accessed in the target logical extent. The I/O controller 1352 acquires the combination of the physical extent number and the offset by referring to the address translation table 1331, based on the logical block address and the logical extent number of the leading logical block.

By acquiring the combination of the physical extent number and the offset of the leading physical block, the I/O controller 1352 specifies c physical blocks that are to be actually accessed and begins with the leading physical block, and also specifies a storage device (tier) that includes the c physical blocks. After that, the I/O controller 1352 accesses the specified c physical blocks in the specified storage device through the SIF controller 132. If the access request is a write access request, and if no physical block is allocated to logical blocks falling in a logical block range designated by the access request, the I/O management unit 1353 allocates, during, for example, the execution of step S3, free physical blocks continuously arranged in the high-speed storage device 11 (upper tier), to the respective logical blocks in the logical block range.

After accessing the specified c physical blocks (step S5), the I/O controller 1352 returns a response to the host 20 through the HIF controller 131 (step S6). Subsequently, the I/O controller 1352 transfers control to the tiering controller 1355. At this time, the tiering controller 1355 determines whether the access has been made to the low-speed storage device 12 (lower tier) (step S7).

If it has been the access to the lower tier (Yes in step S7), it is highly likely that the target logical extent will be accessed in near future, and hence the tiering controller 1355 determines that the data of the physical extent allocated to the target logical extent is to be transferred to the upper tier for the improvement of access performance. Further, if the target logical extent belongs to an extent group, the tiering controller 1355 determines that the data of physical extents allocated to all the other logical extents in the extent group also is to be transferred to the upper tier, since it is also highly likely that the other logical extents will be accessed in near future. In view of this, the tiering controller 1355 executes data transfer source determination processing for determining, as sources from which data is to be transferred (hereinafter, referred to as data transfer sources), one or more physical extents including the physical extent allocated to the target logical extent (step S8).

Referring then to FIG. 20, the data transfer source determination processing (step S8) will be described in detail. FIG. 20 is a flowchart showing an exemplary procedure of the data transfer source determination processing. First, the tiering controller 1355 refers to the EGN field of an entry of the extent management table 1332 associated with the target logical extent (step S71).

Next, the tiering controller 1355 determines whether the target logical extent belongs to the extent group, based on whether a numerical value other than the initial value of 0 is set in the referred EGN field (step S72). If the target logical extent belongs to the extent group (Yes in step S72), the tiering controller 1355 proceeds to step S73. In step S73, the tiering controller 1355 specifies a set of physical extents allocated to all logical extents in the extent group that includes the target logical extent. Further, in step S73, the tiering controller 1355 determines, as data transfer sources, all physical extents in the lower tier, which are included in the specified set of physical extents. The determined data transfer sources include the physical extent to which the target logical extent is allocated. Then, the tiering controller 1355 completes the data transfer source determination processing.

In contrast, if the target logical extent does not belong to the extent group (No in step S72), the tiering controller 1355 determines, as a data transfer source, only the physical extent allocated to the target logical extent (step S74). Then, the tiering controller 1355 thereby completing the data transfer source determination processing.

Returning to FIG. 8, the access processing will further be described. After executing the data transfer source determination processing (step S8) in accordance with the flowchart of FIG. 20, the tiering controller 1355 proceeds to step S9. In step S9, the tiering controller 1355 sets, as variable q, the number of physical extents determined as the data transfer sources (step S9).

Next, the tiering controller 1355 searches the upper tier for a free area (step S10). That is, the tiering controller 1355 searches, based on the address translation table 1331, for physical extents (namely, free physical extents) that are included in the upper tier (high-speed storage device 11), and are not allocated to logical extents. If a free physical extent list is stored in the memory 133 (local HDD 134), the tiering controller 1355 may search, from the list, for the free physical extents in the upper tier. Assume here that the free physical extent list holds physical extent numbers allocated to the free physical extents.

When the tiering controller 1355 has detected the free physical extents in the upper tier, it sets the number of free physical extents as variable f (step S11). In step S11, the tiering controller 1355 subtracts variable f from variable q, and sets the difference (q−f) as variable r. Next, the tiering controller 1355 determines whether variable r (=q−f) is positive (step S12).

If variable r is positive (i.e., if q>f) (Yes in step S12), the tiering controller 1355 determines that r free physical extents are lacking in order to transfer, to the upper tier, the data of q physical extents determined as data transfer sources. In this case, the tiering controller 1355 executes free-area securing processing for securing at least r new free physical extents in the upper tier (step S13). After that, the tiering controller 1355 proceeds to step S14.

In contrast, if variable r is not positive (i.e., if q≤f) (No in step S12), the tiering controller 1355 determines that free physical extents sufficient to transfer the data of the q physical extents determined as the data transfer sources already exist. In this case, the tiering controller 1355 skips step S13, and proceeds to step S14.

Figure 21:
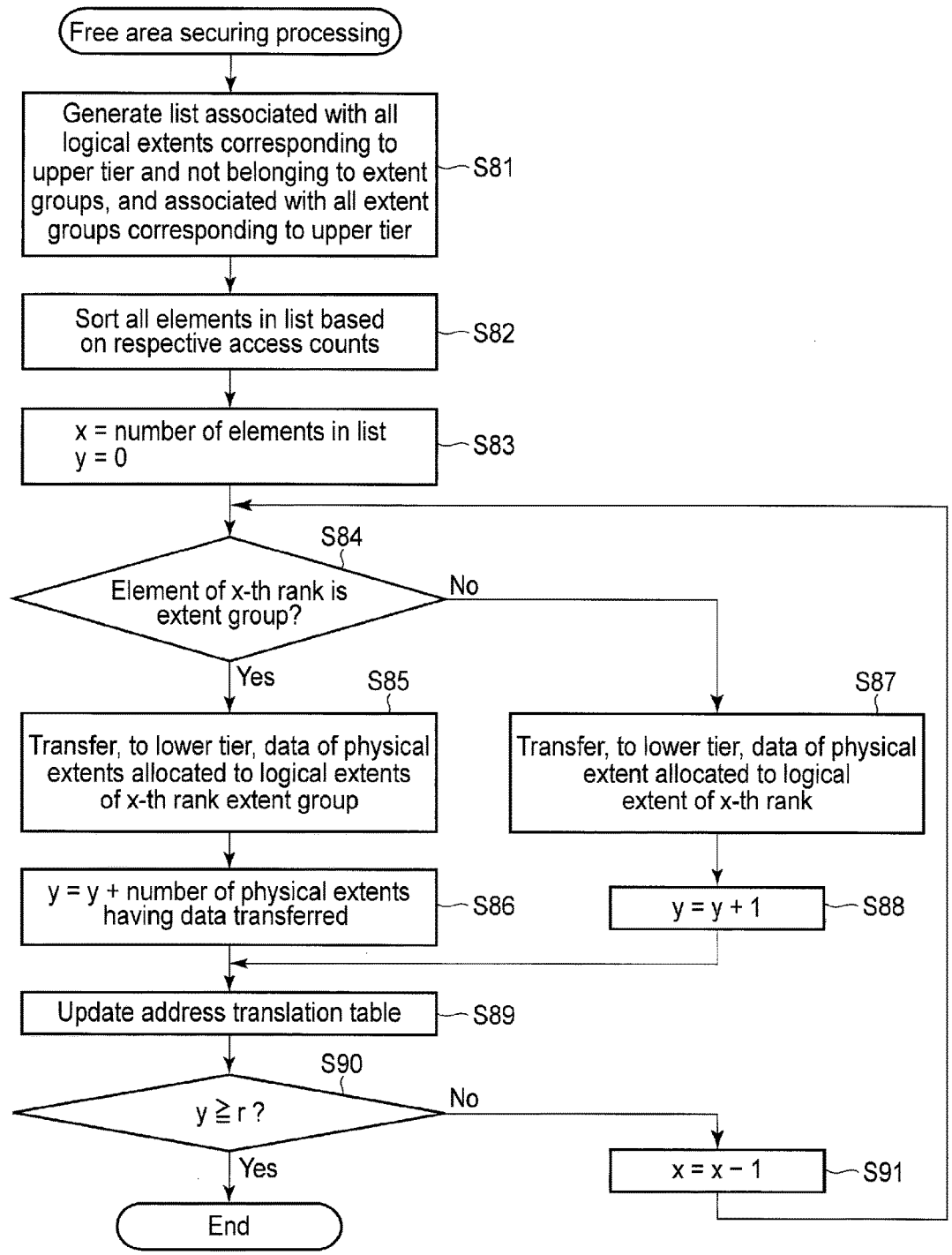
FIG. 21 is a flowchart showing an exemplary procedure of free-area securing processing included in the access processing of FIG. 8.

Referring to FIG. 21, the free-area securing processing (step S13) will be described in detail. FIG. 21 is a flowchart showing an exemplary procedure of the free-area securing processing. In the following description, if physical extents in the upper tier are allocated to logical extents, these logical extents will be referred to as logical extents corresponding to the upper tier. Similarly, if physical extents in the upper tier are allocated to logical extents in an extent group, the extent group will be referred to as an extent group corresponding to the upper tier.

In the free-area securing processing, first, the tiering controller 1355 generates a list associated with all logical extents corresponding to the upper tier and not belonging to extent groups, and associated with all extent groups corresponding to the upper tier (step S81). The generated list includes elements associated with the logical extents not belonging to the extent groups, and elements associated with the extent groups.

Each of the elements in the list, which are associated with the logical extents not belonging to the extent groups, includes a combination of the logical extent number, the access count and the last access time of a corresponding logical extent. Similarly, each of the elements in the list, which are associated with the extent groups, includes a combination of the extent group number, the access count and the last access time of a corresponding extent group.

In the embodiment, the tiering controller 1355 uses, as the access count of each extent group, the average of the access counts of all logical extents belonging to a corresponding extent group. However, the tiering controller 1355 may use, as the access count of each extent group, the greatest one of the access counts of all logical extents belonging to a corresponding extent group. Moreover, in the embodiment, the tiering controller 1355 uses, as the last access time data of each extent group, last access time data included in the last access time data items of all logical extents belonging to a corresponding extent group and indicating a most recent access time.

During the generation of the above-mentioned list, the tiering controller 1355 specifies logical extents not belonging to the extent groups, and extent groups, based on the extent management table 1332. Further, the tiering controller 1355 determines whether the specified logical extents correspond to the upper tier, by referring to the address translation table 1331 based on the logical extent numbers of the specified logical extents. That is, the tiering controller 1355 determines whether the specified logical extents correspond to the upper tier, based on the physical extent numbers of physical extents allocated to the specified logical extents. Similarly, the tiering controller 1355 determines whether the specified extent groups correspond to the upper tier, by referring to the address translation table 1331 based on the logical extent numbers of logical extents included in the specified extent groups. That is, based on the physical extent numbers of physical extents allocated to the logical extents in the specified extent groups, the tiering controller 1355 determines whether the logical extents in the specified extent groups correspond to the upper tier, and determines, based on this determination result, whether the specified extent groups correspond to the upper tier.

After the generation of the above-mentioned list, the tiering controller 1355 sorts (for example, in an ascending order of access count) all elements in the list, based on the access count (more specifically, the access count and the last access time) of each element (step S82). In this sorting, if a plurality of elements having the same access count exist, the tiering controller 1355 arranges the elements such that the earlier the last access time, the lower in rank the element. However, for simplification of the description, it is assumed that if the rank of a certain element is higher (lower) than that of another element, the access count of the certain element is greater (smaller) than that of the other. Moreover, the rank of the element having the smallest access count is treated as lowest.

Next, the tiering controller 1355 sets the number of elements in the generated list as the initial value of variable x (step S83). Variable x is used as a pointer for indicating the position (that is, rank) of an element (more specifically, the position (i.e., rank) of an element after sorting) in the generated list. Therefore, in the description below, variable x will be referred to as pointer x. In step S83, the tiering controller 1355 sets variable y as an initial value of 0. Variable y represents the number of physical extents having data transferred from the upper tier to the lower tier in the free-area securing processing, that is, the number of free physical extents newly secured in the upper tier.

Next, the tiering controller 1355 determines whether an element in the list, designated by pointer x (that is, an element of the x-th rank), is an extent group (step S84). If the element of the x-th rank is the extent group (Yes in step S84), the tiering controller 1355 transfers the data of physical extents, which are allocated to the respective logical extents of the x-th rank extent group, from the upper tier (high-speed storage device 11) to a free area in the lower tier (low-speed storage device 12) (step S85). By this data transfer, the tiering controller 1355 can newly secure, as free physical extents (free area), the physical extents in the upper tier allocated to the respective logical extents of the x-th rank extent group.

Subsequently, the tiering controller 1355 increments variable y by the number of physical extents whose data has been transferred by the execution of step S84 (step S86). Thereafter, the tiering controller 1355 proceeds to step S89.

In contrast, if the element of the x-th rank is not an extent group (No in step S84), that is, if the element of the x-th rank is a logical extent, the tiering controller 1355 transfers the data of a physical extent allocated to the logical extent of the x-th rank, from the upper tier to a free area in the lower tier (step S87). By this data transfer, the tiering controller 1355 can secure, as a free physical extent, a physical extent in the upper tier allocated to the logical extent of the x-th rank. After that, the tiering controller 1355 increments variable y by 1 (step S88), and proceeds to step S89.

In step S89, the tiering controller 1355 updates the address translation table 1331 to reflect data transfer in step S85 or S87. That is, if step S89 is executed in accordance with the execution of step S85, the tiering controller 1355 updates the address translation table 1331 so that the physical extents (physical blocks in the physical extents), which are allocated to the respective logical extents (logical blocks in the logical extents) of the x-th rank extent group, will be changed from the physical extents (physical blocks in the physical extents) as the data transfer sources in step S85, to physical extents (physical blocks in the physical extents) as data transfer destinations in step S85. In contrast, if step S89 is executed in accordance with the execution of step S87, the tiering controller 1355 updates the address translation table 1331 so that a physical extent allocated to the x-th rank logical extent will be changed from the physical extent as a data transfer source in step S87 to a physical extent as a data transfer destination.

After updating the address translation table 1331, the tiering controller 1355 proceeds to step S90. In step S90, the tiering controller 1355 determines whether variable y updated at step S86 or S88 is greater than or equal to variable r. If variable y is greater than or equal to r (Yes in step S90), the tiering controller 1355 determines that at least r new free physical extents have been secured in the upper tier by the free-area securing processing. At this time, the tiering controller 1355 completes the free-area securing processing.

As described above, in the embodiment, the tiering controller 1355 does not reflect, in the extent management table 1332 or the link management table 1333, data transfer for securing a free area, which is performed in steps S85 and S87. However, the tiering controller 1355 may update the extent management table 1332 and the link management table 1333 in accordance with data transfer for securing a free area. In this case, however, the link management table 1333 is not updated when the data transfer is performed in step S87.

In contrast, if variable y is less than variable r (No in step S90), the tiering controller 1355 determines that at least r new free physical extents have not yet secured in the upper tier. In this case, the tiering controller 1355 continues the free-area securing processing as follows.

First, the tiering controller 1355 decrements pointer x by 1 (step S91). After that, the tiering controller 1355 returns to step S84, thereby determining whether the element in the list designated by decremented pointer x is an extent group. As is evident, the rank of the element used in the current determination is higher by 1 than that of an element used in the last determination. Subsequent operations are the same as those performed after the last determination. Steps S84 to S91 are repeated until at least r new free physical extents are secured in the upper tier.

Returning to FIG. 8, the access processing will be further described. After executing free-area securing processing in accordance with the flowchart of FIG. 21 (step S13), the tiering controller 1355 proceeds to step S14. At this time, the upper tier includes at least (f+r) (=q) physical extents. Accordingly, the tiering controller 1355 transfers the data of the q physical extents, determined by the data transfer source determination processing (step S8), to the free area (more specifically, q free physical extents) in the upper tier (step S14). The tiering controller 1355 performs the above-described data transfer also when the free-area securing processing (step S13) is skipped (No in step S12) (step S14).

Next, the tiering controller 1355 updates the address translation table 1331, the extent management table 1332 and the link management table 1333 to reflect the data transfer in step S14 (step S15). That is, the tiering controller 1355 updates the address translation table 1331 to allocate q physical extents (physical blocks in the physical extents) as data transfer destinations, to q logical extents (logical blocks in the logical extents) to which q physical extents as data transfer sources are allocated. The tiering controller 1355 further updates the access counts and the last access time data items in entries of the extent management table 1332 associated with the above-mentioned q logical extents. Moreover, the tiering controller 1355 increments, by 1, each of the degrees of linkage in the link management table 1333, associated with the respective combinations of successively accessed logical extents that are included in the above-mentioned q logical extents.

After executing step S15, the tiering controller 1355 returns control to the I/O controller 1352. At this time, the I/O controller 1352 decrements variable e by 1 (step S16). After that, the I/O controller 1352 determines whether variable e decremented by 1 is less than zero (negative) (step S17). If variable e decremented by 1 is less than zero (Yes in step S17), the I/O controller 1352 determines that all logical extents in the specified logical extent range have been accessed. Subsequently, the I/O controller 1352 stores, in the particular area of the memory 133, the logical extent number of the last processed target logical extent (namely, the last logical extent in the specified logical extent range) (step S18), thereby completing the access processing according to the flowchart of FIG. 8.

In contrast, if variable e decremented by 1 is not less than 0 (No in step S17), the I/O controller 1352 determines that e logical extents that have not yet been accessed exist in the specified logical extent range. Therefore, the I/O controller 1352 returns to step S4, and selects, as a target logical extent, a logical extent succeeding the preceding accessed logical extent, from e (i.e., the number indicated by variable e) logical extents that have not yet been accessed. After that, processing succeeding step S4 (namely, processing including steps S5 to S7) is executed as in the case where the target logical extent was selected in step S4 of the first loop.

If a physical extent allocated to the target logical extent selected at step S4 of the first loop exists in the lower tier (Yes in step S7), data transfer from the lower tier to the upper tier is performed at step S14 of the first loop. Because of this, if the target logical extent selected in step S4 of the first loop belongs to an extent group, a set of physical extents allocated to all logical extents in the extent group exist in the upper tier after the execution of step S14 of the first loop. Accordingly, a physical extent allocated to a target logical extent selected in step S4 of the second loop exists in the upper tier (No in step S7). In this case, steps S8 to S15 are skipped, and step S16 is executed.

Also when the physical extent allocated to the target logical extent selected in step S4 of the first loop exists in the upper tier (No in step S7), steps S8 to S15 are skipped, and step S16 is executed. If the physical extent allocated to the target logical extent selected in step S4 of the second loop exists in the lower tier (Yes in step S7), step S8 is executed.

In the embodiment, by executing step S14 in the access processing according to the access request, the tiering controller 1355 transfers, to the upper tier, data of all physical extents in the lower tier included in a set of physical extents allocated to all logical extents in an extent group, to which a logical extent range designated in an access request from the host 20 belongs. This data transfer can be executed with a smaller overhead within a shorter period than a conventional data transfer between the tiers based on periodical access frequency evaluation.

Respective logical extents in an extent group, to which a designated logical extent range belongs, have high degrees of linkage in simultaneous access, and may well be accessed in near future even if they have small access counts. In the embodiment, it is guaranteed that the data of each logical extent (i.e., the data of a physical extent allocated thereto) in the extent group all exists in the upper tier by the above-described data transfer. Therefore, when an access to an arbitrary logical block range in the above-mentioned extent group is requested in near future after the data transfer, the I/O controller 1352 can quickly access a physical block range corresponding to the arbitrary logical block range.

In the flowchart of FIG. 8, the determination (step S17) associated with variable e is performed immediately after the decrement (step S16) of variable e. However, the determination associated with variable e may be performed immediately before, for example, the selection (step S4) of a target logical extent. In this case, the I/O controller 1352 must determine whether variable e is less than 1, unlike step S17. That is, the I/O controller 1352 may proceed to step S4 if variable e is not less than 1, and may proceed to step S18 if variable e is less than 1. Further, the I/O controller 1352 may determine whether variable e is less than 1, after the decrement (step S16) of variable e.

<Modification>

A modification of the embodiment will now be described. In the embodiment, no limitations are imposed on the scale of the extent group. Because of this, the extent group may become enormous over time. If the extent group is enormous, a lot of time is required to transfer, from the lower tier to the upper tier, the data of, for example, all logical extents (i.e., the data of physical extents allocated thereto) in the extent group. In view of this, the modification is characterized in that an enormous extent group is divided into two extent groups by regrouping processing.

Referring to FIG. 22, regrouping processing according to the modification will be described. FIG. 22 is a flowchart showing the procedure of the regrouping processing. The regrouping processing of the modification is assumed to be added immediately before step S3 (i.e., immediately after step S2) in the access processing shown in the flowchart of FIG. 8. Therefore, if necessary, the regrouping processing may be inserted between steps S2 and S3 in the flowchart of FIG. 8.

First, the group management unit 1354 determines whether extent group expansion has occurred, based on the result of update of the extent management table 1332 in step S2 of FIG. 8 (step S101). The extent group expansion means that the number of logical extents that constitute an extent group is increased. In the above-described second case, extent group expansion will occur.

If no extent group expansion has occurred (No in step S101), the group management unit 1354 determines that regrouping is not necessary. In this case, the group management unit 1354 completes the regrouping processing according to the flowchart of FIG. 22, and proceeds to step S3 of FIG. 8.

In contrast, if the extent group expansion has occurred (Yes in step S101), the group management unit 1354 specifies an expanded extent group (step S102). Next, the group management unit 1354 detects the number Ne of logical extents that constitute the specified extent group, based on the extent management table 1332 (step S103).

To manage the number of logical extents extent group by extent group, the group management unit 1354 may use an extent group management table that includes entries associated with the respective extent groups. Each entry of this extent group management table is used to hold the number of logical extents that constitute a corresponding extent group.

Next, the group management unit 1354 determines whether the detected number Ne of logical extents exceeds a threshold Nth (step S104). The threshold Nth is a reference value for determining whether the specified extent group has grown enormous. In the modification, the threshold Nth is set to a constant ratio, for example, ½, of the maximum number of extents that can be arranged in the upper tier (high-speed storage device 11). However, the threshold Nth may be set to another value.

If Ne does not exceed Nth (No in step S104), the group management unit 1354 determines that it is not necessary to regroup the specified extent group. In this case, the group management unit 1354 completes the regrouping processing, and proceeds to step S3 of FIG. 8.

In contrast, if Ne exceeds Nth (Yes in step S104), the group management unit 1354 executes three preprocesses (first to third preprocesses) for regrouping the specified extent group, as described below. First, the group management unit 1354 executes a first preprocess to detect a pair of logical extents (a combination of second and third logical extents) that have a minimum degree of linkage (more specifically, a minimum degree of linkage other than 0) in the specified extent group (step S105). Step S105 will now be described in detail.

First, the group management unit 1354 specifies all logical extents in the specified extent group, based on the extent management table 1332. Next, the group management unit 1354 acquires, from the link management table 1333, the degrees of linkage of respective pairs of successively accessed logical extents included in the specified logical extents. The group management unit 1354 detects a minimum degree of linkage in the acquired degrees of linkage. Thus, the group management unit 1354 detects a pair of logical extents that have the minimum degree of linkage.

Figure 23:
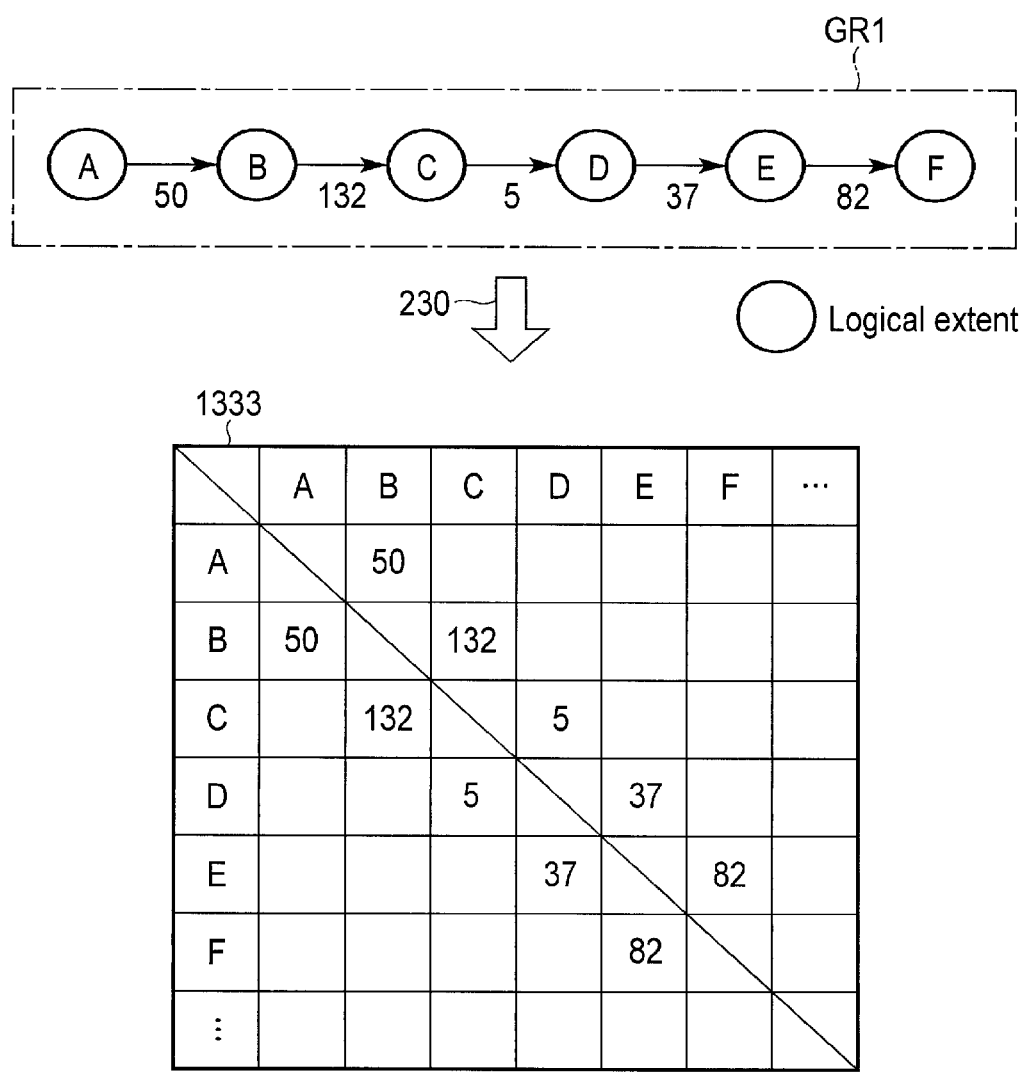
FIG. 23 is a diagram showing a configuration example of an expanded extent group, and examples of linkage degrees of respective pairs of successively accessed logical extents included in the expanded extent group, along with an example of the link management table.

FIG. 23 shows a configuration example of an extent group GR1 and examples of linkage degrees of respective pairs of successively accessed logical extents included in extent group GR1, along with an example of the link management table 1333, which examples are obtained when extent group GR1 is specified as an expanded extent group. In the examples of FIG. 23, it is assumed for simplification of the description that extent group GR1 includes six logical extents A, B, C, D, E and F (Ne=6), and Nth is 5. However, in general, Ne and Nth are sufficiently greater than these values.

In FIG. 23, the arrows that connect logical extent A, B, C, D, E and F in this order indicate the order of access. Therefore, the preceding and succeeding link extents of, for example, logical extent C are logical extents B and D, respectively. In FIG. 23, the degrees of linkage (A, B) [=(B, A)], (B, C) [=(C, B)], (C, D) [=(D, C)], (D, E) [=(E, D)] and (E, F) [=(F, E)] of the respective pairs of adjacent logical extents in extent group GR1 are 50, 132, 5, 37 and 82, respectively. These degrees of linkage are reflected in the link management table 1333 as shown by arrow 230. In the example of FIG. 23, 5 is detected as the minimum degree of linkage.

Next, the group management unit 1354 executes a second preprocess to normalize all degrees of linkage (more specifically, all degrees of linkage other than 0) in the link management table 1333, using the detected minimum degree of linkage (step S106). This normalization means dividing each of all degrees of linkage in the link management table 1333 by the detected minimum degree of linkage. In FIG. 23, the minimum degree of linkage is the degree of linkage (C, D) [=(D, C)], namely, 5.

FIG. 24 shows, for comparison, examples of the link management table 1333 obtained before and after the second preprocess (normalization). In FIG. 24, the link management table 1333 before normalization is shown on the bottom side of arrow 240, and the link management table 1333 after normalization is shown on the tip side of arrow 240. The contents of the link management table 1333 before normalization coincides with that of the link management table 1333 shown in FIG. 23. The minimum degree of linkage (C, D) [=(D, C)] in the link management table 1333 is changed by the normalization from 5 to 1 as shown in FIG. 24.

Next, the group management unit 1354 performs the third preprocess to replace the normalized minimum degree of linkage (namely, 1) in the link management table 1333 with 0 that indicates no linkage (step S107). The linkage degree of 0 is equal to the value expressed as a blank as mentioned above. By this replacement, the linkage of a pair of logical extents having the minimum linkage of 1 is canceled.

FIG. 25 shows, for comparison, examples of the link management table 1333 obtained before and after the third preprocess (replacement with 0). In FIG. 25, the link management table 1333 before the replacement with 0 is shown on the bottom side of arrow 250, and the link management table 1333 after the replacement with 0 is shown on the tip side of arrow 250.

Next, the group management unit 1354 regroups all extents in the specified extent group to reflect the above-mentioned replacement with the linkage degree of (that is, to cancel the linkage relationship between the pair of logical extents having the degree of linkage thereof replaced with 0) (step S108). That is, the group management unit 1354 divides the specified extent group (second extent group) into an extent group (third extent group) including one (second logical extent) of the pair of logical extents having the degree of linkage thereof replaced with 0, and an extent group (fourth extent group) including the other (third logical extent) of the pair of logical extents, based on the extent management table 1332 and the link management table 1333.

In the modification, the group management unit 1354 imparts a new extent group number, which is currently not used, to an extent group including the preceding one (hereinafter, referred to as a preceding extent) of the pair of logical extents having the degree of linkage thereof replaced with 0. Further, the group management unit 1354 imparts the extent group number of the original extent group (namely, the specified extent group) to an extent group including the succeeding one (hereinafter, referred to as a succeeding extent) of the pair of logical extents having the degree of linkage thereof replaced with 0. However, this may be modified in an opposite way.

In the regrouping (step S108), the group management unit 1354 updates the extent management table 1332 as below. First, the group management unit 1354 updates the contents of the EGN field and the SLE field in an entry of the extent management table 1332 associated with the preceding extent, to the above-mentioned new extent number and −1, respectively. The group management unit 1354 also updates, to −1, the contents of the PLE field in an entry of the extent management table 1332 associated with the succeeding extent.

After executing the regrouping (step S108), the group management unit 1354 completes the regrouping processing according to the flowchart of FIG. 22. Subsequently, in the modification, step S3 in the flowchart of FIG. 8 is performed. Alternatively, the regrouping processing may be performed at a time other than immediately before step S3, that is, for example, immediately after step S3.

FIG. 26 shows an example of the link management table 1333 obtained before the regrouping (i.e., immediately after the third preprocess), and shows, for comparison, examples of extent groups obtained immediately before and after the regrouping. In FIG. 26, the link management table 1333 before the regrouping is shown on the bottom side of arrow 261. As is evident from the above description of step S108, the link management table 1333 is not updated in the regrouping. That is, the link management table 1333 does not change before and after the regrouping. Therefore, the link management table 1333 shown in FIG. 26 also shows the state assumed after the regrouping. In FIG. 26, the configuration of extent group GR1 before the regrouping is shown on the tip side of arrow 261 and the bottom side of arrow 262. Extent group GR1 before the regrouping, shown in FIG. 26, includes logical extents A, B, C, D, E and F, as is also clear from FIG. 23.

The degree of linkage of a pair of logical extents C and D in extent group GR1 before the regrouping is already changed to 0 by the third preprocess (step S107). Therefore, the tiering controller 1355 cancels the linkage of logical extents C and D. After that, the tiering controllers 1355 excludes, from extent group GR1, logical extents C, A and B (namely, logical extent C and logical extents A and B that have a direct or indirect linkage with logical extent C), and makes them belong to new extent group GRa. That is, the tiering controller 1355 regroups logical extents A, B, C, D, E and F in extent group GR1 into new extent group GRa including logical extents A, B and C, and reduced extent group GR1 including logical extents D, E and F, as is indicated by arrow 262 in FIG. 26 (step S108).

The at least one embodiment described above can make data transfer between tiers more efficient.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A tiered storage system comprising:
    a first storage device including a first storage area having a plurality of physical extents each including a first number of physical blocks, the first storage device being positioned as an upper tier;
    a second storage device including a second storage area having a plurality of physical extents each including the first number of physical blocks, the second storage device having a lower access speed than the first storage device and being positioned as a lower tier; and
    a storage controller which controls access to the first and second storage devices, the storage controller comprising a configuration management unit, an input/output controller, an input/output management unit, a group management unit and a tiering controller,
    wherein
    the configuration management unit constructs a logical unit including a virtualized storage area comprising a plurality of logical blocks each having a size identical to a size of each of the physical blocks, and provides the logical unit to a host computer which uses the tiered storage system;
    the input/output controller reads data from the first or second storage device or writes data to the first or second storage device in accordance with an access request from the host computer;
    the input/output management unit manages the virtualized storage area of the logical unit as a storage area including a plurality of logical extents each comprising the first number of logical blocks;
    the group management unit manages a strength of linkage, associated with access, of a respective combination of two different logical extents included in the plurality of logical extents, based on a degree of linkage which indicates a degree of successive access to the respective combination, and manages, as extent groups, sets of logical extents included in respective series of combinations that mutually have a linkage relationship; and the tiering controller transfers data of q physical extents, allocated to q logical extents, in the second storage device to q free physical extents in the first storage device, and changes q physical extents to be allocated to the q logical extents from the q physical extents in the second storage device to the q physical extents in the first storage device, when the access request designates access to one or more logical blocks including a first logical block, the first logical block is included in a first logical extent, and the first logical extent belongs to an extent group including the q logical extents.

2. The tiered storage system of claim 1, wherein the input/output management unit acquires an access statistical value indicating a status of access to a respective one of the plurality of logical extents;

the group management unit determines an access statistical value of a respective one of the extent groups, based on all logical extents belonging to the respective extent group; and when the number of free physical extents in the first storage device is less by r than the q physical extents, the tiering controller selects one or more logical extents belonging to none of the extent groups, and/or one or more extent groups, in an ascending order of first access statistical values and second access statistical values, the one or more logical extents and/or the one or more extent groups corresponding to at least r physical extents whose data is to be transferred from the first storage device to the second storage device, the first access statistical values being access statistical values of logical extents which belong to none of the extent groups and to which respective physical extents in the first storage device are allocated, the second access statistical values being access statistical values of extent groups comprising sets of logical extents to which respective physical extents in the first storage device are allocated; and the tiering controller increases the number of free physical extents in the first storage device by at least r, by transferring data of the at least r physical extents in the first storage device, which are allocated to the selected one or more logical extents and/or all logical extents in the one or more extent groups, to the same number of free physical extents in the second storage device as the at least r physical extents in the first storage device.

3. The tiered storage system of claim 2, wherein the input/output management unit determines, as the access statistical value of the respective extent group, a maximum access statistical value or an average statistic value of all logical extents belonging to the respective extent group.

4. The tiered storage system of claim 2, wherein the input/output management unit manages the status of access to the respective logical extent, using the access statistical value and a last access time of the respective logical extent;

the group management unit uses, as a last access time of the respective extent group, a most recent access time of last access times of the logical extents included in the respective extent group; and the tiering controller increases a rank of selection of a selection candidate having an older last access time when a plurality of selection candidates having a same access statistical value exist.

5. The tiered storage system of claim 1, wherein the group management unit detects a first extent group including a number of logical extents exceeding a second number of logical extents, based on the number of logical extents constituting a respective one of the extent groups;

the group management unit detects, in the first extent group, a combination of a second logical extent and a third logical extent, which has a minimum degree of linkage; and the group management unit regroups the first extent group into a second extent group including the second logical extent and a third extent group including the third logical extent.

6. The tiered storage system of claim 5, wherein the group management unit normalizes the degree of linkage of the respective combination, using the minimum degree of linkage; and the group management unit replaces a normalized minimum degree of linkage with a value indicating no linkage.

7. The tiered storage system of claim 5, wherein the second number is determined, based on the number of physical extents in the first storage device, in which data can be arranged.

8. The tiered storage system of claim 5, wherein when p is an integer not less than 2, the one or more logical blocks are p logical blocks successively arranged in the logical unit, a part of the p logical blocks is included in the first logical extent, and another part of the p logical blocks is included in a fourth logical extent, the group management unit increments a degree of linkage of a combination of the first and fourth logical extents.

9. The tiered storage system of claim 5, wherein the storage controller further comprises an extent management table which holds an extent group identifier, a preceding link extent identifier, a succeeding link extent identifier, an access statistical value and last access time data in association with a respective one of the plurality of logical extents, the extent group identifier indicating an extent group to which the respective logical extent belongs, the preceding link extent identifier indicating a logical extent which precedes the respective logical extent in order of access, the succeeding link extent identifier indicating a logical extent which succeeds the respective logical extent in order of access, the access statistical value indicating a status of access to the respective logical extent, the last access time data indicating a last access time when the respective logical extent was last accessed;

the input/output management unit updates, in accordance with the access request, an access statistical value and last access time data associated with at least one logical extent corresponding to an access range designated by the access request; and the group management unit updates, in accordance with the access request, an extent group identifier, a preceding link extent identifier and a succeeding link extent identifier associated with the at least one logical extent corresponding to the access range designated by the access request.

10. The tiered storage system of claim 9, wherein the storage controller further comprises a linkage management table which holds the degree of linkage of the respective combination.

11. A storage controller used in a tiered storage system for controlling access to a first storage device and a second storage device included in the tiered storage system, the first storage device including a first storage area having a plurality of physical extents each including a first number of physical blocks, the first storage device being positioned as an upper tier, the second storage device including a second storage area having a plurality of physical extents each including the first number of physical blocks, the second storage device having a lower access speed than the first storage device and being positioned as a lower tier, the storage controller comprising:
   a configuration management unit;
   an input/output controller;
   an input/output management unit;
   a group management unit; and
   a tiering controller,
   wherein:
   the configuration management unit constructs a logical unit including a virtualized storage area comprising a plurality of logical blocks each having a size identical to a size of each of the physical blocks, and provides the logical unit to a host computer which uses the tiered storage system;
   the input/output controller reads data from the first or second storage device or writes data to the first or second storage device in accordance with an access request from the host computer;
   the input/output management unit manages the virtualized storage area of the logical unit as a storage area including a plurality of logical extents each comprising the first number of logical blocks;
   the group management unit manages a strength of linkage, associated with access, of a respective combination of two different logical extents included in the plurality of logical extents, based on a degree of linkage which indicates a degree of successive access to the respective combination, and manages, as extent groups, sets of logical extents included in respective series of combinations that mutually have a linkage relationship; and
   the tiering controller transfers data of q physical extents, allocated to q logical extents, in the second storage device to q free physical extents in the first storage device, and changes q physical extents to be allocated to the q logical extents from the q physical extents in the second storage device to the q physical extents in the first storage device, when the access request designates access to one or more logical blocks including a first logical block, the first logical block is included in a first logical extent, and the first logical extent belongs to an extent group including the q logical extents to which the q physical extents in the second storage device are allocated.

12. The storage controller of claim 11, wherein
   the input/output management unit acquires an access statistical value indicating a status of access to a respective one of the plurality of logical extents;
   the group management unit determines an access statistical value of a respective one of the extent groups, based on all logical extents belonging to the respective extent group; and
   when the number of free physical extents in the first storage device is less by r than the q physical extents, the tiering controller selects one or more logical extents belonging to none of the extent groups, and/or one or more extent groups, in an ascending order of first access statistical values and second access statistical values, the one or more logical extents and/or the one or more extent groups corresponding to at least r physical extents whose data is to be transferred from the first storage device to the second storage device, the first access statistical values being access statistical values of logical extents which belong to none of the extent groups and to which respective physical extents in the first storage device are allocated, the second access statistical values being access statistical values of extent groups comprising sets of logical extents to which respective physical extents in the first storage device are allocated; and
   the tiering controller increases the number of free physical extents in the first storage device by at least r, by transferring data of the at least r physical extents in the first storage device, which are allocated to the selected one or more logical extents and/or all logical extents in the one or more extent groups, to the same number of free physical extents in the second storage device as the at least r physical extents in the first storage device.

13. The storage controller of claim 12, wherein the input/output management unit determines, as the access statistical value of the respective extent group, a maximum access statistical value or an average statistic value of all logical extents belonging to the respective extent group.

14. The storage controller of claim 12, wherein
   the input/output management unit manages the status of access to the respective logical extent, using the access statistical value and a last access time of the respective logical extent;
   the group management unit uses, as a last access time of the respective extent group, a most recent access time of last access times of the logical extents included in the respective extent group; and
   the tiering controller increases a rank of selection of a selection candidate having an older last access time when a plurality of selection candidates having a same access statistical value exist.

15. The storage controller of claim 11, wherein
   the group management unit detects a first extent group including a number of logical extents exceeding a second number of logical extents, based on the number of logical extents constituting a respective one of the extent groups;
   the group management unit detects, in the first extent group, a combination of a second logical extent and a third logical extent, which has a minimum degree of linkage; and
   the group management unit regroups the first extent group into a second extent group including the second logical extent and a third extent group including the third logical extent.

16. The storage controller of claim 15, wherein
   the group management unit normalizes the degree of linkage of the respective combination, using the minimum degree of linkage; and
   the group management unit replaces a normalized minimum degree of linkage with a value indicating no linkage.

17. The storage controller of claim 15, wherein when p is an integer not less than 2, the one or more logical blocks are p logical blocks successively arranged in the logical unit, a part of the p logical blocks is included in the first logical extent, and another part of the p logical blocks is included in a fourth logical extent, the group management unit increments a degree of linkage of the first and fourth logical extents.

18. A method, in a storage controller which controls access to a first storage device and a second storage device, for tiering, as an upper tier and a lower tier, the first storage device and the second storage device, respectively, the first storage device including a first storage area having a plurality of physical extents each including a first number of physical blocks, the second storage device including a second storage area having a plurality of physical extents each including the first number of physical blocks, the second storage device having a lower access speed than the first storage device, the storage controller constructing a logical unit including a virtualized storage area comprising a plurality of logical blocks each having a size identical to a size of each of the physical blocks, and providing the logical unit to a host computer which uses a tiered storage system including the first and second storage devices, the method comprising:

reading data from the first or second storage device or writing data to the first or second storage device in accordance with an access request from the host computer;

managing the virtualized storage area of the logical unit as a storage area including a plurality of logical extents each comprising the first number of logical blocks;

managing a strength of linkage, associated with access, of a respective combination of two different logical extents included in the plurality of logical extents, based on a degree of linkage which indicates a degree of successive access to the respective combination;

managing, as extent groups, sets of logical extents included in respective series of combinations that mutually have a linkage relationship; and transferring data of q physical extents, allocated to q logical extents, in the second storage device to q free physical extents in the first storage device, and changing q physical extents to be allocated to the q logical extents from the q physical extents in the second storage device to the q physical extents in the first storage device, when the access request designates access to one or more logical blocks including a first logical block, the first logical block is included in a first logical extent, and the first logical extent belongs to an extent group including the q logical extents to which the q physical extents in the second storage device are allocated.

19. The method of claim 18, further comprising:

acquiring an access statistical value indicating a status of access to a respective one of the plurality of logical extents;

determining an access statistical value of a respective one of the extent groups, based on all logical extents belonging to the respective extent group;

when the number of free physical extents in the first storage device is less by r than the q physical extents, selecting one or more logical extents belonging to none of the extent groups, and/or one or more extent groups, in an ascending order of first access statistical values and second access statistical values, the one or more logical extents and/or the one or more extent groups corresponding to at least r physical extents whose data is to be transferred from the first storage device to the second storage device, the first access statistical values being access statistical values of logical extents which belong to none of the extent groups and to which respective physical extents in the first storage device are allocated, the second access statistical values being access statistical values of extent groups comprising sets of logical extents to which respective physical extents in the first storage device are allocated; and increasing the number of free physical extents in the first storage device by at least r, by transferring data of the at least r physical extents in the first storage device, which are allocated to the selected one or more logical extents and/or all logical extents in the one or more extent groups, to the same number of free physical extents in the second storage device as the at least r physical extents in the first storage device.

20. The method of claim 18, further comprising:

detecting a first extent group including a number of logical extents exceeding a second number of logical extents, based on the number of logical extents constituting a respective one of the extent groups;

detecting, in the first extent group, a combination of a second logical extent and a third logical extent, which has a minimum degree of linkage; and regrouping the first extent group into a second extent group including the second logical extent and a third extent group including the third logical extent.

* * * * *